(12) United States Patent  (10) Patent No.: US 7,395,625 B2
Chladny  (45) Date of Patent: Jul. 8, 2008

(54) DISPLAY AND PROTECTIVE DEVICE FOR PERSONAL TRANSPORTER

(75) Inventor: Benjamin Chladny, 12895 Humber Station Rd., Bolton, Ontario (CA) L7E 5R9

(73) Assignee: Benjamin Chladny, Bolton (CA)

( * ) Notice: Subject to any disclaimer, the term of this patent is extended or adjusted under 35 U.S.C. 154(b) by 374 days.

(21) Appl. No.: 10/807,165

(22) Filed: Mar. 24, 2004

(65) Prior Publication Data

US 2005/0072843 A1    Apr. 7, 2005

Related U.S. Application Data

(60) Provisional application No. 60/508,298, filed on Oct. 6, 2003.

(51) Int. Cl.
*B62J 17/04* (2006.01)
(52) U.S. Cl. ............... 40/591; 280/87.041; 280/288.1; 296/78.1
(58) Field of Classification Search ............... 296/180.1, 296/180.2, 77.1, 78.1, 84.1; 280/78.1; 40/591
See application file for complete search history.

(56) References Cited

U.S. PATENT DOCUMENTS

| | | | | |
|---|---|---|---|---|
| 597,298 A | | 1/1898 | Ross | |
| 651,660 A | * | 6/1900 | Greem | 296/78.1 |
| 1,042,305 A | * | 10/1912 | Wrigjt | 296/78.1 |
| 1,292,610 A | * | 1/1919 | Jackson | 296/78.1 |
| 1,292,910 A | * | 1/1919 | Jackson | 108/122 |
| 2,045,983 A | * | 6/1936 | Ferrigno | 280/87.042 |
| 3,801,152 A | * | 4/1974 | Tims et al. | 296/78.1 |
| 3,921,740 A | * | 11/1975 | Forster | 180/213 |
| D252,923 S | * | 9/1979 | Montenare | D12/186 |
| D253,541 S | * | 11/1979 | Fragoso | D21/423 |
| 4,179,133 A | * | 12/1979 | Robb | 280/87.041 |
| 4,615,556 A | * | 10/1986 | Stahel | 296/78.1 |
| 4,655,497 A | * | 4/1987 | Mallett | 296/78.1 |
| 4,790,555 A | * | 12/1988 | Nobile | 296/78.1 |
| 4,842,091 A | * | 6/1989 | Badsey | 180/219 |
| 5,022,666 A | * | 6/1991 | Simon | 280/1.16 |
| 5,267,767 A | * | 12/1993 | Farrow | 296/78.1 |
| 5,657,566 A | | 8/1997 | Key | |
| 5,704,679 A | | 1/1998 | Sodo | |
| D428,364 S | * | 7/2000 | Kirkpatrick | D12/112 |
| 6,109,639 A | | 8/2000 | Blassingame et al. | |
| 6,122,850 A | | 9/2000 | Strzeletz | |
| 6,231,104 B1 | * | 5/2001 | Roethel | 296/78.1 |
| 6,279,986 B1 | | 8/2001 | Hinsperger | |
| 6,659,211 B2 | | 12/2003 | Esposito | |
| D498,439 S | * | 11/2004 | Kirkpatrick et al. | D12/112 |
| 6,904,709 B2 | | 6/2005 | Craig et al. | |
| 2003/0094315 A1 | | 5/2003 | White | |
| 2004/0262871 A1 | | 12/2004 | Schreuder et al. | |
| 2005/0205310 A1 | * | 9/2005 | Pelz | 180/6.2 |

* cited by examiner

*Primary Examiner*—Cassandra Davis
(74) *Attorney, Agent, or Firm*—Bereskin & Parr

(57) ABSTRACT

A device for mounting on a personal transporter intended to transport a rider in a standing position, for example a Segway HT, having a front panel disposed adjacent the front of the personal transporter and two side panels disposed adjacent the sides of the personal transporter. The device is releasably attachable to a personal transporter, and is suitable for displaying advertising. The device also provides protection to a rider.

23 Claims, 19 Drawing Sheets

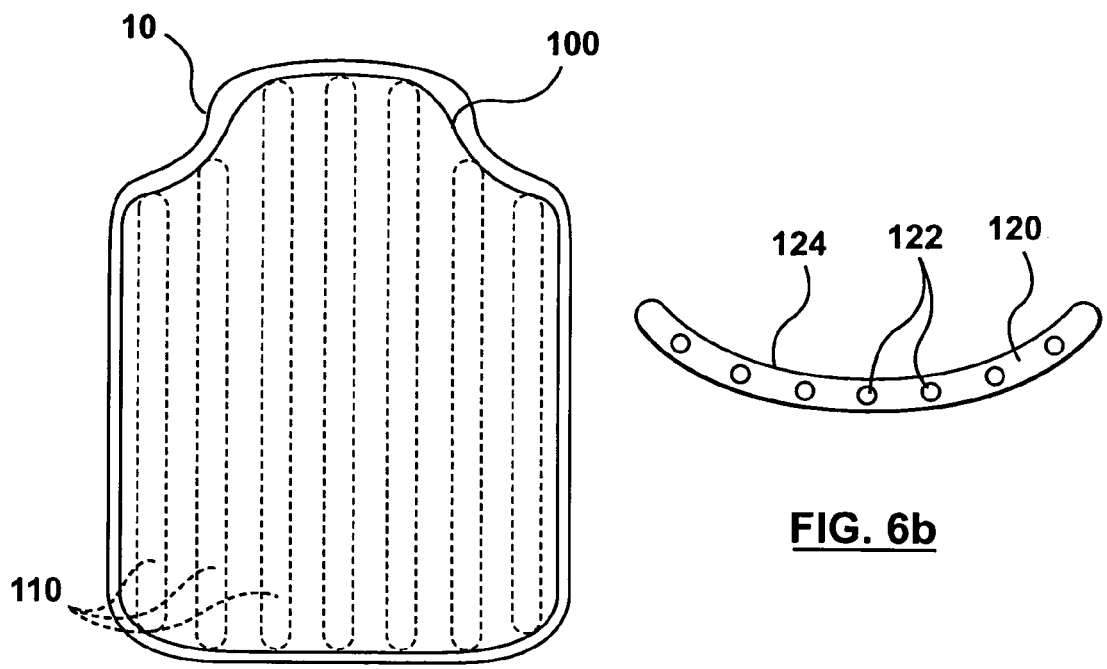
FIG. 6a
FIG. 6b
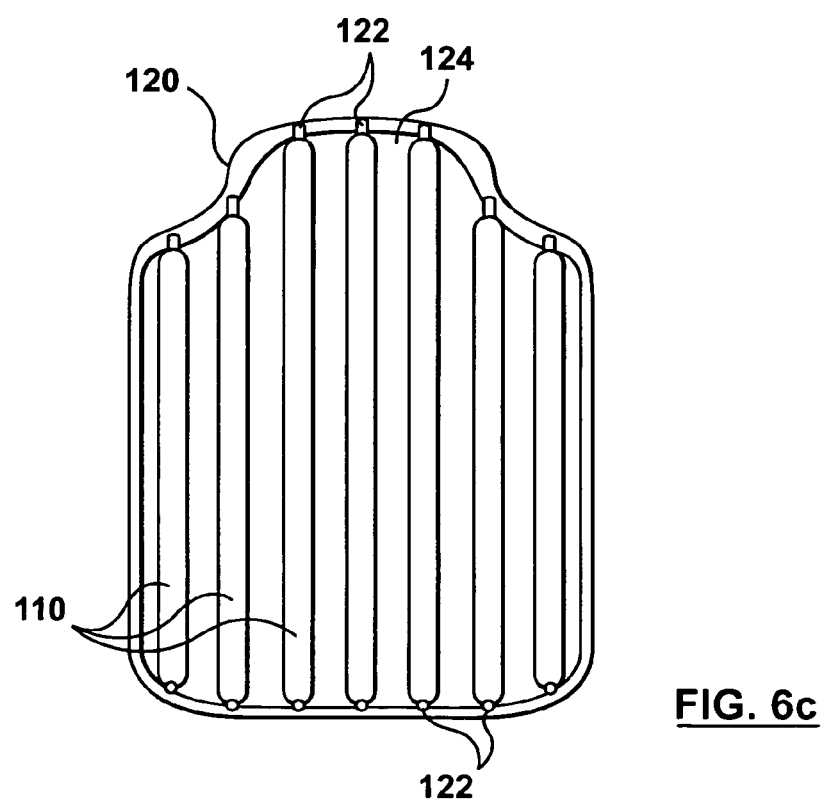
FIG. 6c

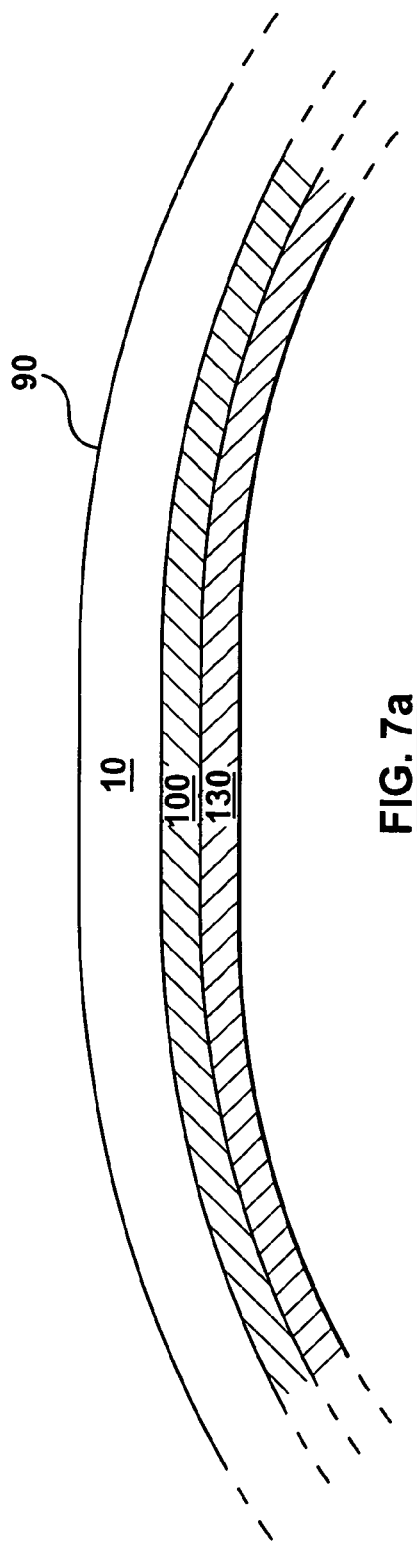
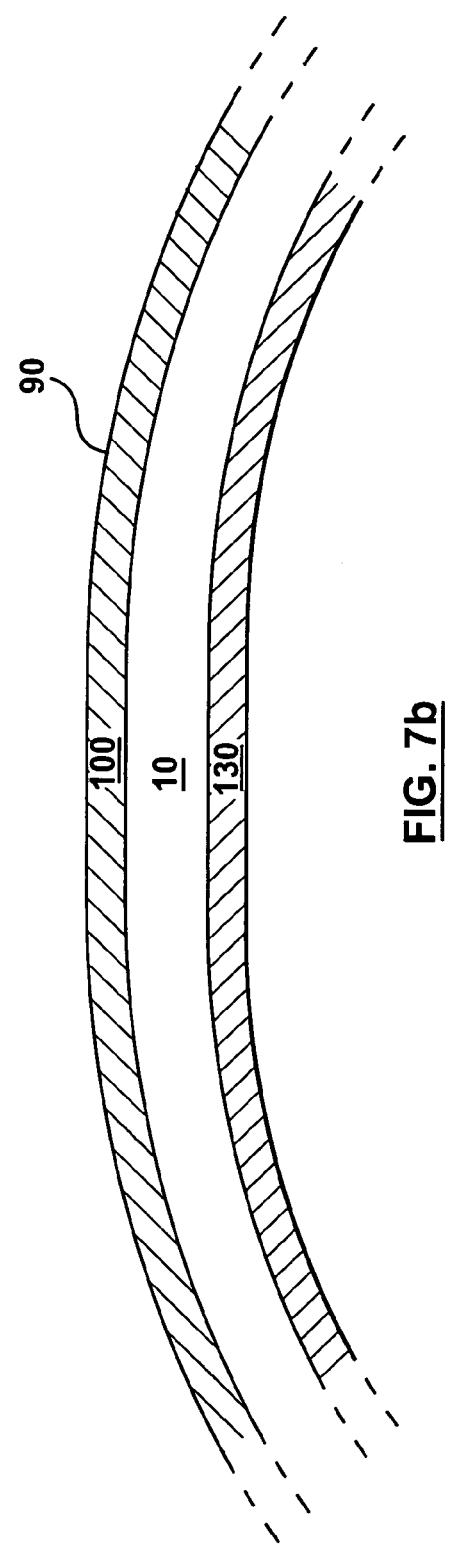

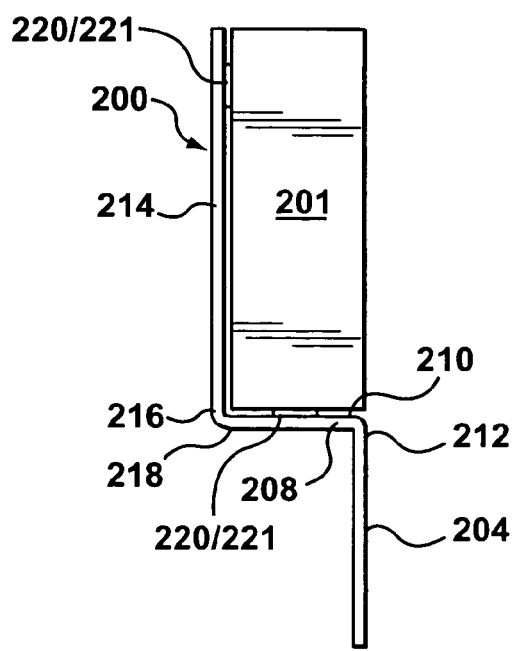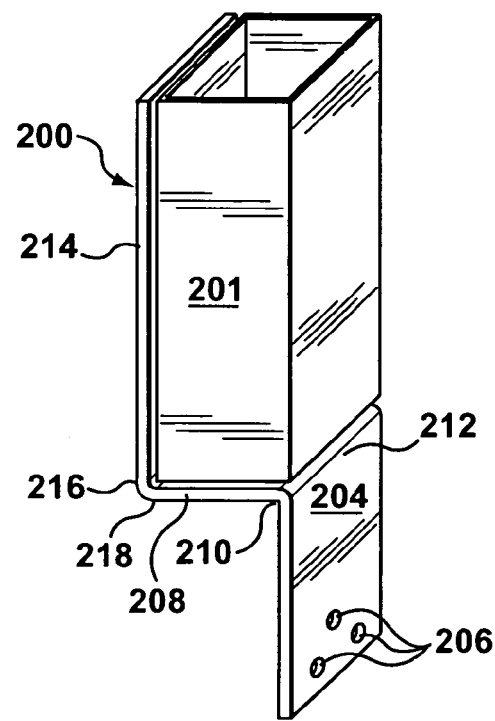
FIG. 13    FIG. 14

DISPLAY AND PROTECTIVE DEVICE FOR PERSONAL TRANSPORTER

FIELD OF THE INVENTION

The present invention relates to display and protective devices for use with powered vehicles, and more particularly to display and protective devices for use with powered vehicles intended to transport a rider in a standing position.

BACKGROUND OF THE INVENTION

Powered vehicles intended to transport a rider in a standing position have become available to consumers. Such devices are referred to herein as "personal transporters". One example of a personal transporter is the Segway HT (Human Transporter) manufactured by Segway LLC, 286 Commercial Street, Manchester, N.H. 03101. Personal transporters such as the Segway HT, however, provide only limited protection for a rider, and do not provide an effective means to display advertising or other display material.

SUMMARY OF THE INVENTION

One particularly advantageous application for the present invention is the display of advertising or other promotional material. Personal transporters are relatively uncommon, and therefore a person using a personal transporter in public is likely to attract the attention of a substantial number of onlookers. This attention provides an excellent opportunity for advertising and other marketing activities. Thus, the device provides an advertising display surface that can be used to display items such as corporate trademarks and other advertising materials. For example, a personal transporter having a device of the present invention could have a company name or trademark emblazoned on the display surface and could be operated by an employee carrying samples or promotional material. The employee could then be sent to operate the personal transporter at a public event, where its relative novelty would serve to attract spectators, who would then view the trademark and be in a position to receive the samples or literature. Furthermore, the device of the present invention may be adapted to include an integral sound system having powerful speakers, so that music or an audio message could be used to further enhance the promotional effectiveness of the device.

In a preferred embodiment, the present invention is directed to a device for use with a powered vehicle intended to transport a rider in a standing position, wherein the device comprises attachment means for releasably mounting the device to the vehicle, a front panel that is generally disposed adjacent to a front side of the vehicle when the device is mounted on the vehicle, and a pair of side panels adjacent to the front panels, each of said side panels being generally disposed adjacent to a side of the vehicle when the device is mounted on the vehicle.

In another preferred embodiment, the present invention is directed to a device for use with a powered vehicle having parallel wheels disposed adjacent opposite sides of the vehicle, wherein the device comprises attachment means for releasably mounting the device to the vehicle, a front panel that is generally disposed adjacent to a front side of the vehicle when the device is mounted on the vehicle, and a pair of side panels adjacent to the front panel, each of the side panels generally disposed adjacent to a side of the vehicle when the device is mounted on the vehicle.

In another aspect, the present invention is directed to a method of communicating an advertising message to potential customers, the method comprising providing a personal transporter intended to transport a rider in a standing position, providing an advertising display panel on the personal transporter, the advertising display panel having at least one advertising message disposed thereon, and operating the personal transporter having the advertising display panel at a location typically frequented by persons within a desired target audience.

In yet another aspect, the present invention is directed to a carrier for use with a powered vehicle intended to transport a rider in a standing position and having a standing platform and a wheel shroud disposed adjacent the standing platform, the carrier comprising a container, a mounting plate adapted for mounting to the wheel shroud, and support means for supporting the container on the mounting plate.

In a still further aspect, the present invention is directed to a battery carrier for use with a powered vehicle intended to transport a rider in a standing position and having a standing platform and a wheel shroud disposed adjacent the standing platform, the carrier comprising a mounting plate adapted for mounting to the wheel shroud, and support means for supporting a battery on the mounting plate.

BRIEF DESCRIPTION OF THE DRAWINGS

FIG. 6a is a front view of a device according to the present invention equipped with a first embodiment of an illumination means.

FIG. 6b is a top view of a first embodiment of an illumination means for use with a device according to the present invention.

FIG. 6c is a front view of a first embodiment of an illumination means for use with a device according to the present invention.

FIG. 7a is a top view of a portion of a first configuration of a device according to the present invention when equipped with an image panel and a second embodiment of an illumination means.

FIG. 7b is a top view of a portion of a second configuration of a device according to the present invention when equipped with an image panel and a second embodiment of an illumination means.

FIG. 13 is a rear view of a carrier according to the present invention with a container secured thereto.

FIG. 14 is a perspective view of a carrier according to the present invention with a container secured thereto.

DETAILED DESCRIPTION OF THE INVENTION

Figure 1:
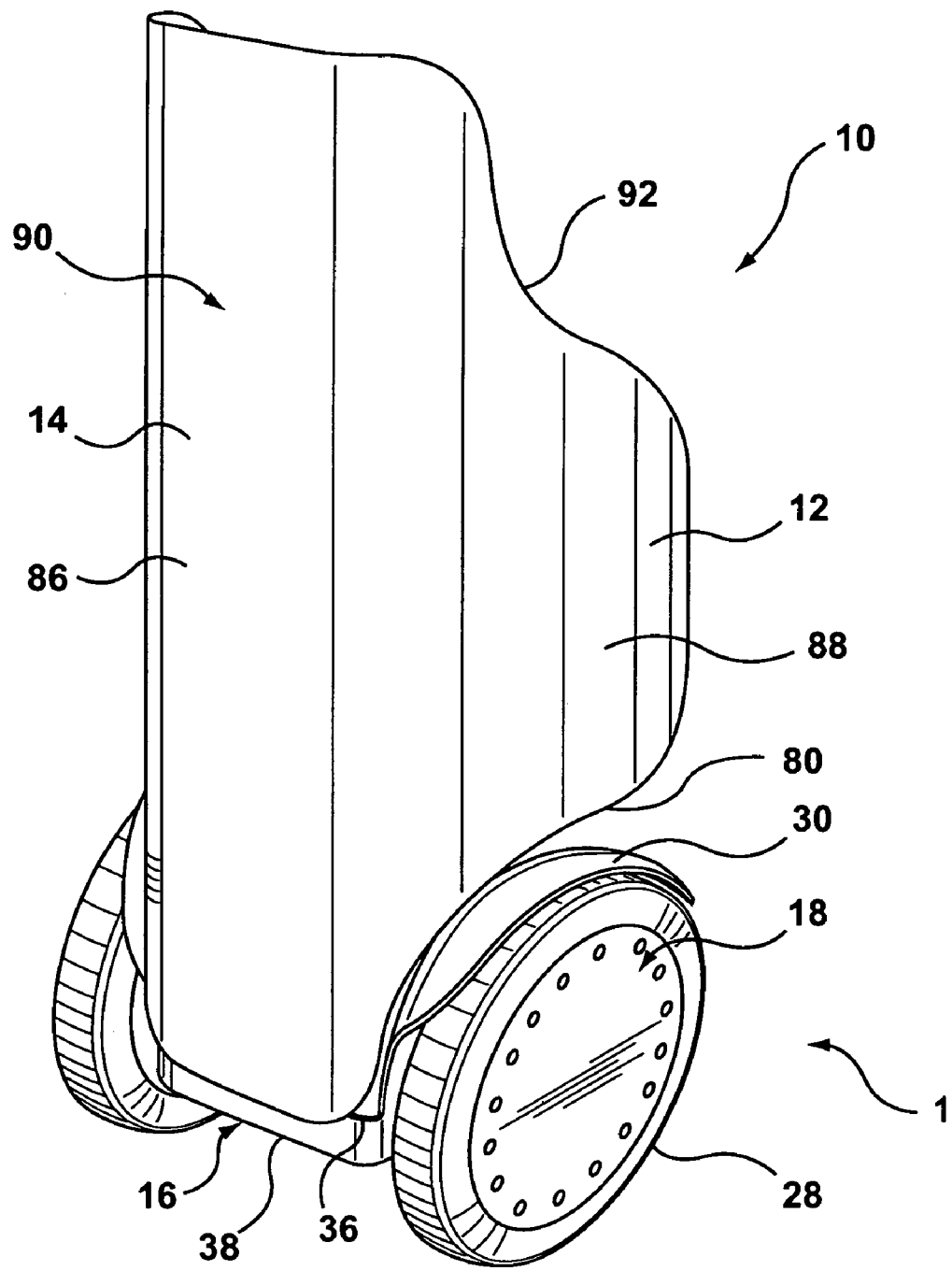
FIG. 1 is a perspective view of a device according to the present invention secured to a personal transporter.

Referring to FIG. 1, a device of the present invention is secured to a personal transporter 1 and is indicated generally at 10. While the personal transporter used to illustrate an exemplary embodiment of device 10 is a Segway HT, it will be understood by one skilled in the art that the present invention encompasses a device for use with any personal transporter, i.e., any powered vehicle intended to transport a rider in a standing position, referred to hereinafter as a "personal transporter".

In a preferred embodiment, device 10 comprises side panels 12 and front panel 14. As can be seen in FIG. 1, front panel 12 is generally disposed adjacent to front side 16 of personal transporter 1, and each side panel 12 is generally disposed adjacent to a side 18 of personal transporter 1. The terms "front" and "side" are relative to the forward direction of travel of personal transporter 1.

Figure 2:
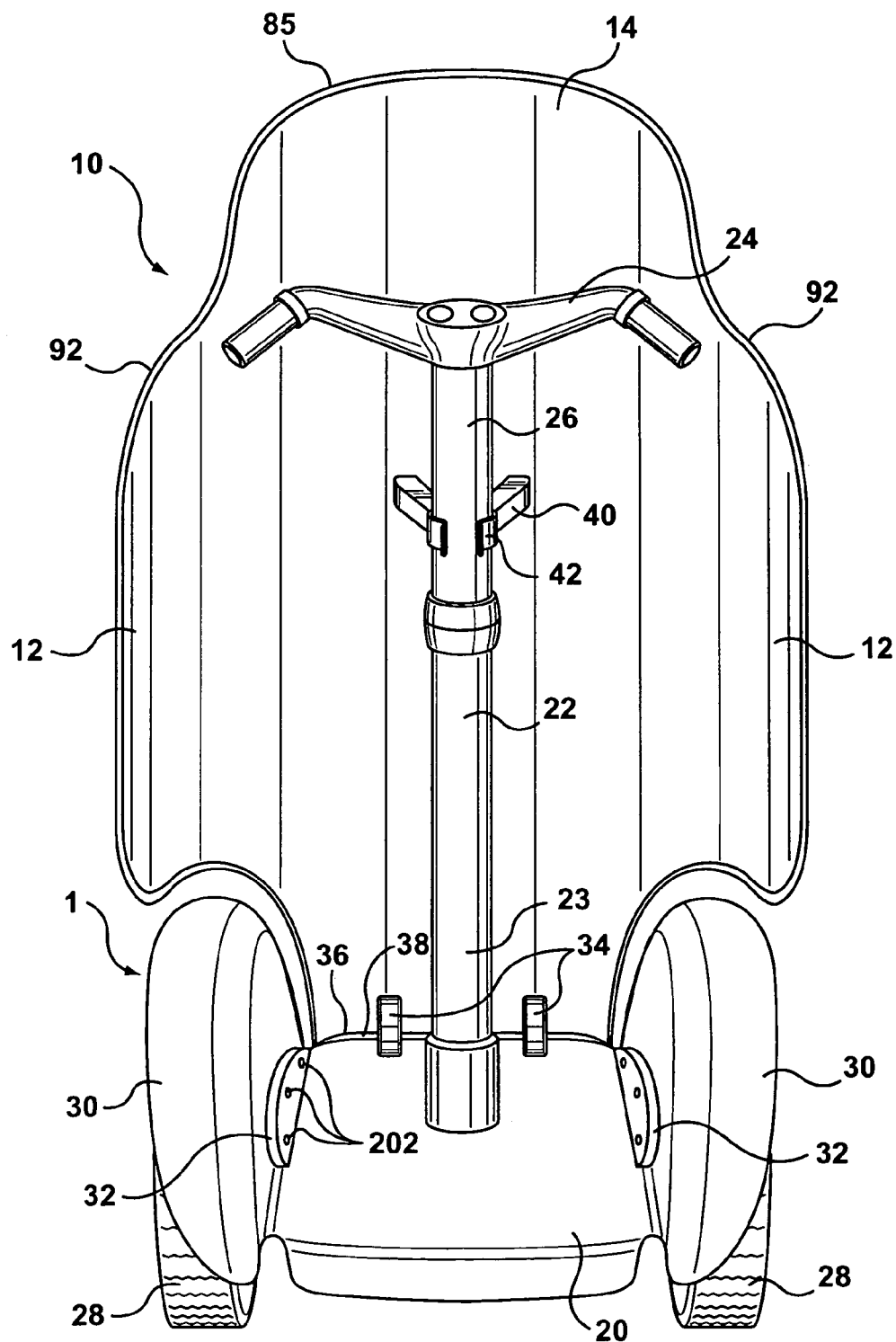
FIG. 2 is a rear view of a device according to the present invention having a first attachment me, secured to a personal transporter.

Now referring to FIG. 2, the attachment means by which a preferred embodiment of device 10 is secured to a personal transporter 1 are shown.

Personal transporter 1 comprises standing surface 20 on which a user will stand, shaft 22 which is secured at lower end 23 to standing surface 20, and handlebar 24, which is secured to upper end 26 of shaft 22. Personal transporter 1 also comprises parallel wheels 28 disposed adjacent opposite sides of personal transporter 1. Fenders 30 are secured to standing surface 20, and shrouds 32 are disposed between fenders 30 and standing surface 20. It will be understood that the particular type or structure of personal transporter 1 forms no part of the present invention.

In a preferred embodiment, front panel 14 has bottom portion 33, to which are secured two hooks 34 for engaging with front edge 36 of personal transporter 1, so that front edge 36 functions as a first support for device 10. Front edge 36 is disposed forward of and adjacent to standing surface 20, and comprises upwardly projecting ridge 38. Hooks 34 and their engagement with front edge 36 are described in greater detail below.

A preferred embodiment of an attachment means for device 10 for engaging a second support on personal transporter 1 comprises bracket 40, to which is secured clamp 42. Clamp 42 is sized to engage shaft 22 in an interference fit, so that shaft 22 functions as a second support for device 10. Clamp 42 and its engagement with shaft 22 are also further described below.

Figure 3:
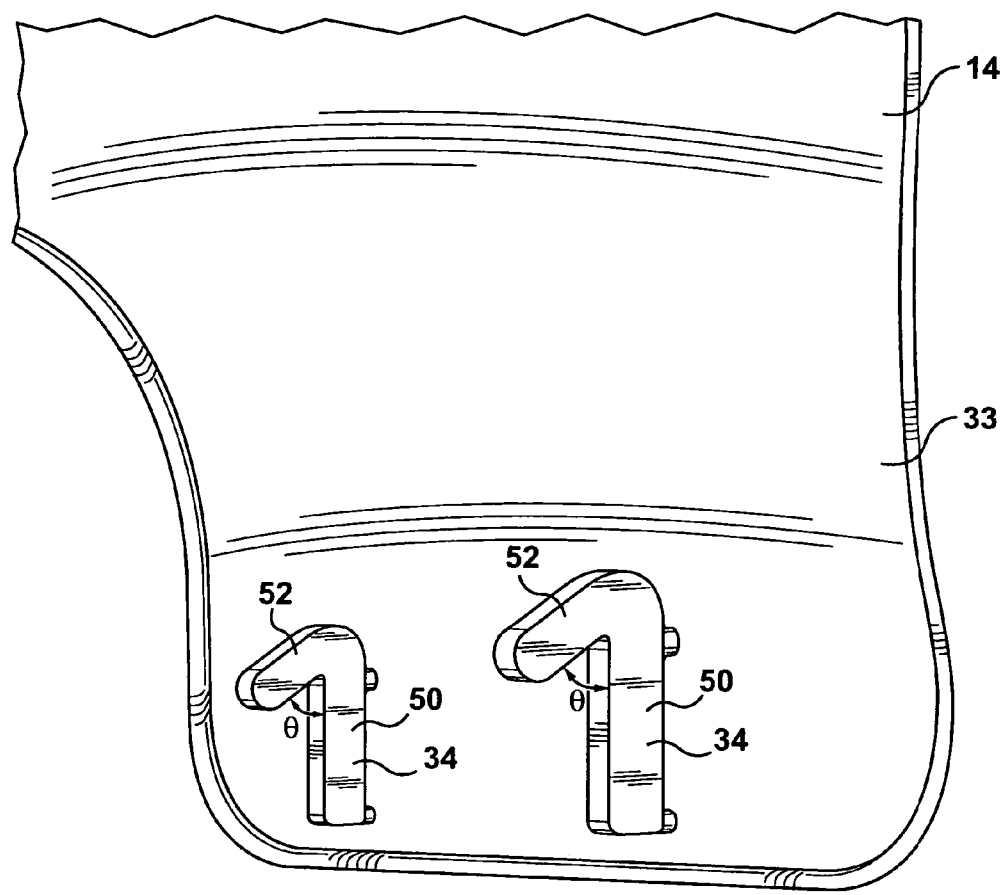
FIG. 3 is a perspective view of a bottom portion of a device according the present invention.
Figure 4:
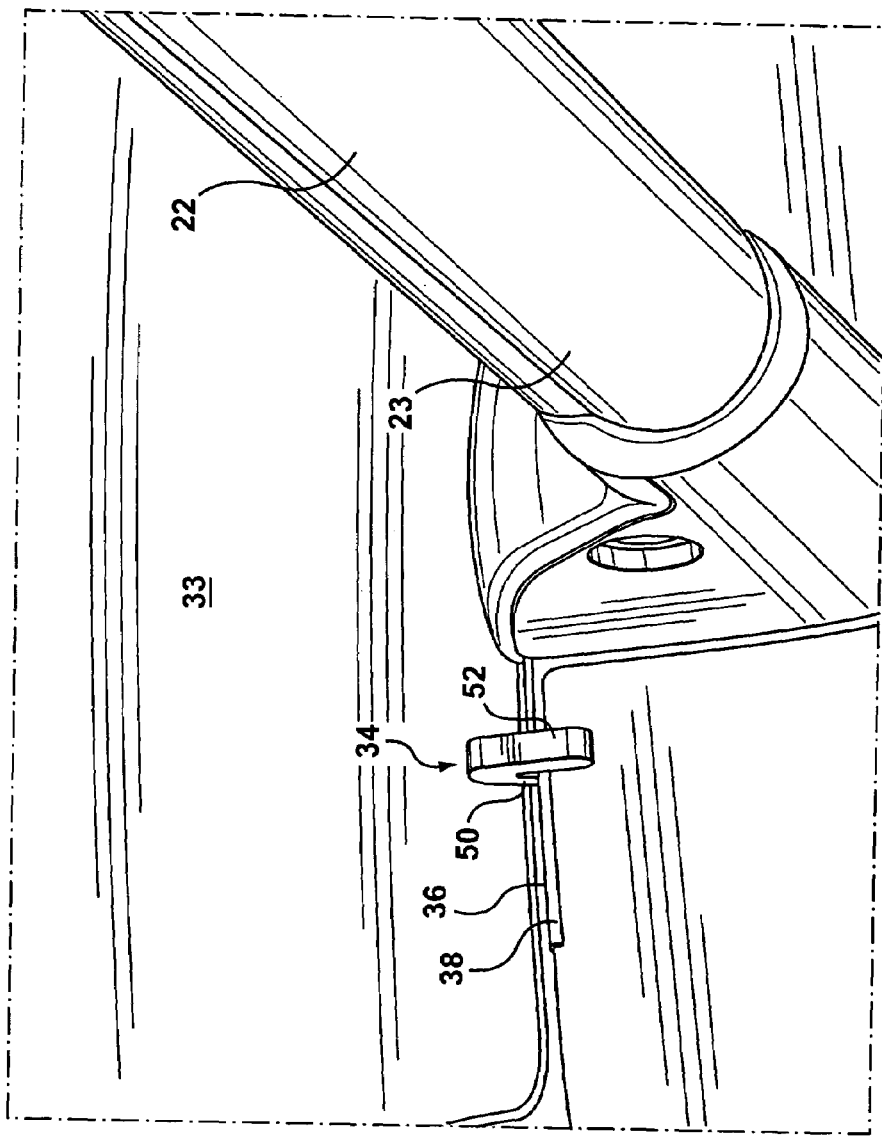
FIG. 4 is a perspective view of a bottom portion of a device according the present invention, secured to a personal transporter.

Now referring to FIGS. 3 and 4, bottom portion 33 of front panel 14, and hooks 34 secured thereto, are shown in greater detail. Hooks 34 each have mating portion 50 for mating with bottom portion 33, and engagement portion 52 for engaging with front edge 36. Mating portion 50 may be secured to bottom portion 33 by any means known in the art, for example by means of screws, rivets or bolts, by welding (in the case of metal components) or by an adhesive of sufficient strength. Alternatively, hooks 34 may be integrally formed with bottom portion 33, in which case mating portion 50 may be omitted and engagement portions 52 may project directly from bottom portion 33.

Engagement portion 52 forms an angle θ with mating portion 52. As noted above, front edge 36 comprises a ridge 38 projecting upwardly from standing surface 20. Hook 34 is shaped, and angle θ is selected, so that ridge 38 fits into the space defined between engagement portion 52 and mating portion 50 of hook 34 so that hook 34, and particularly engagement portion 52, engages with ridge 38 and therefore front edge 36.

Hooks 34 will rest on ridge 38 and front edge 36, and thereby support the weight of device 10. Thus, the action of gravity assists in maintaining device 10 mounted to personal transporter 1. Furthermore, angle θ is acute, so that engagement portions 52 extend behind ridge 38 and thereby help prevent bottom portion 33 from becoming disengaged from front edge 36 by inertial action if personal transporter 1 is moving and comes to a sudden stop. Similarly, mating portions 50 will abut front 38 of personal transporter 1, further serving to maintain device 10 in a mounted position. Thus, the design of hooks 34 assists in preventing accidental disengagement of device 10 from personal transporter 1. It will be appreciated that the hooks 34 provide a releasable mounting. Specifically, simply lifting device 10 in a vertical direction will raise hooks 34 above ridge 38 so that the engagement is released.

Hooks 34 may be made of any suitable material, such as metal or plastic, which provides sufficient strength to support the weight of device 10.

It will of course be understood by one skilled in the art that the shape of hooks 34 may be adapted to fit various personal transporters without departing from the scope of the present invention, for example by making engagement portion 52 curved rather than straight. It will be further understood that attachment means other than hooks may be used, and that such alternative attachment means may engage parts of personal transporter 1 other than front edge 36, without departing from the present invention. For example, a personal transporter may have a built-in recess for receiving attachment means of a device according to the present invention.

Figure 5:
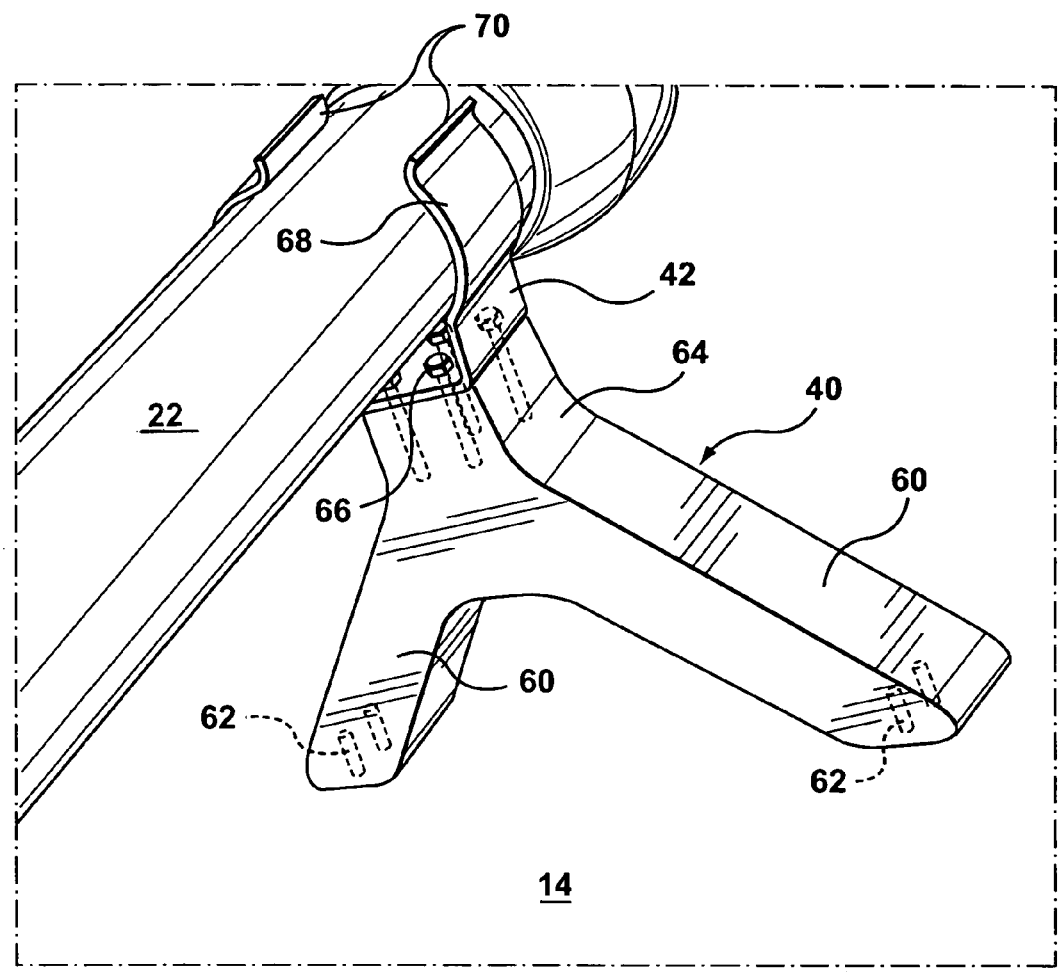
FIG. 5 is a perspective view of an upper portion of a device according to the present invention, secured to a personal transporter.

Now referring to FIG. 5, bracket 40 and clamp 42 are shown in greater detail. Bracket 40 is Y-shaped, and has two mounting arms 60 which are secured to front panel 14 by bolts 62. It will be appreciated that means other than bolts, for example rivets, screws, welding, or a sufficiently strong adhesive, may be used to secure bracket 40 to front panel 14. Alternatively, bracket 40 may be integrally formed with front panel 14. Bracket 40 also has projecting arm 64 to which clamp 42 is secured by means of bolt 66. Again, other means may be used to secure clamp 42 to bracket 40. Furthermore, it will be appreciated that while the Y-shape of bracket 40 provides stability by securing clamp 42 to front panel 14 at two points, other shapes may be used for bracket 40 without departing from the scope of the present invention. It should be noted that bracket 40 is merely one preferred embodiment of an attachment means for device 10 for engaging a second support on personal transporter 1, and that other preferred embodiments will be described below.

Clamp 42 is preferably formed of a resilient material such as spring steel. Clamp 42 is adapted to be snap fit onto shaft 22 of personal transporter 1, so that it engages shaft 22 in an interference fit. Clamp 42 is generally C-shaped, and has curved arms 68, and flanges 70 at the ends of arms 68 for guiding shaft 22 into position. Clamp 42 is releasably securable to shaft 22 by placing shaft 22 against flanges 70 and applying sufficient pressure to force arms 68 far enough apart that shaft 22 proceeds past flanges 70 into clamp 42, at which point the resilient nature of the material causes arms 68 to resume their original position, such that shaft 22 is retained in an interference fit. Clamp 42 may be disengaged from shaft 22 by applying sufficient pressure in the opposite direction. Thus, the combination of clamp 42 and bracket 40 permits front panel 14 and therefore device 10 to be further releasably mounted to personal transporter 1. It will be appreciated by one skilled in the art that other structures may be used for clamp 42 without departing from the scope of the present invention.

Referring back to FIG. 2, it can be seen that hooks 34 and clamp 42 cooperate to releasably mount device 10 on personal transporter 1. In particular, the weight of device 10 is supported on front edge 36 of personal transporter 1 by hooks 34, while clamp 42 secures device 10 to shaft 22 so as to maintain device 10 in an upright position. Thus, device 10 is secured to personal transporter 1 at three contact points (clamp 42 and two hooks 34), providing a stable, releasable mounting that prevents accidental disengagement, and maintains device 10 in a generally fixed position relative to personal transporter 1 such that front panel 14 is oriented toward the forward direction of travel of personal transporter 1.

While the three-point mounting described above is stable, depending on the material used there may still be some undesirable lateral movement of side panels 12 during travel of personal transporter 1, since side panels 12 are not directly secured to personal transporter 1. To obviate this difficulty, means are provided for securing side panels 12 to personal transporter 1. In a preferred embodiment, bottom edges 80 of side panels 12 may have Velcro straps 82 secured thereto. Velcro straps 82 run across fenders 30 and are mated with corresponding Velcro strips 84 secured to standing surface 20 adjacent shroud 32, to thereby reduce undesirable lateral movement of side panels 12. Velcro strips 82 and mating Velcro tabs 84 may be secured to bottom edges 80 and standing surface 20 by means of an adhesive of sufficient strength, or by other means that do not damage personal transporter 1.

An alternate preferred embodiment of device 10, in which side panels 12 are mounted directly to personal transporter 1, will be described below.

Still referring to FIG. 2, in a preferred embodiment, side panels 12 are integrally formed with front panel 14, so that device 10 is formed from a single sheet of material. This material may be metal, plastic or some other suitable material. In an alternative embodiment (not shown), front panel 14 and side panels 12 may be distinct panels, in which case the panels could be mounted to personal transporter independently of each other by a variety of conventional means. Where front panels 14 and side panels 12 are distinct panels, they may nonetheless be joined to each other, for example by joining front panel 14 to each side panel 12 with at least one hinge. Top portion 85 of front panel 14 may optionally be tapered toward the rear of personal transporter 1 (not shown).

One particularly advantageous application for device 10 is the display of advertising or other promotional material. Because personal transporters are still relatively uncommon, the public use of such a machine is likely to attract attention, thereby providing an opportunity for advertising. Thus, referring again to FIG. 1, in a preferred embodiment the front panel 14 has front outside surface 86 and side panels 12 each have side outside surfaces 88. Front outside surface 86 and side outside surfaces 88 comprise display surface 90. Display surface 90 preferably covers at least part of front outside surface 86, and more preferably covers all of front outside surface 86 and side outside surfaces 88. Thus, at least a substantial portion of display surface 90 will be visible to an observer facing personal transporter 1 and positioned anywhere between a 10 o'clock and 2 o'clock position relative to the forward direction of travel (i.e. 12 o'clock). Display surface 90 can be used to display items such as corporate trademarks, and other advertising materials. It will of course be appreciated by one skilled in the art that a single image may cover the entirety of display surface 90, or, alternately, distinct images may be placed on different parts of display surface 90 (for example, a first image could be visible on front outside surface 86, and second and third images could be visible on side outside surfaces 88).

Figure 7C:
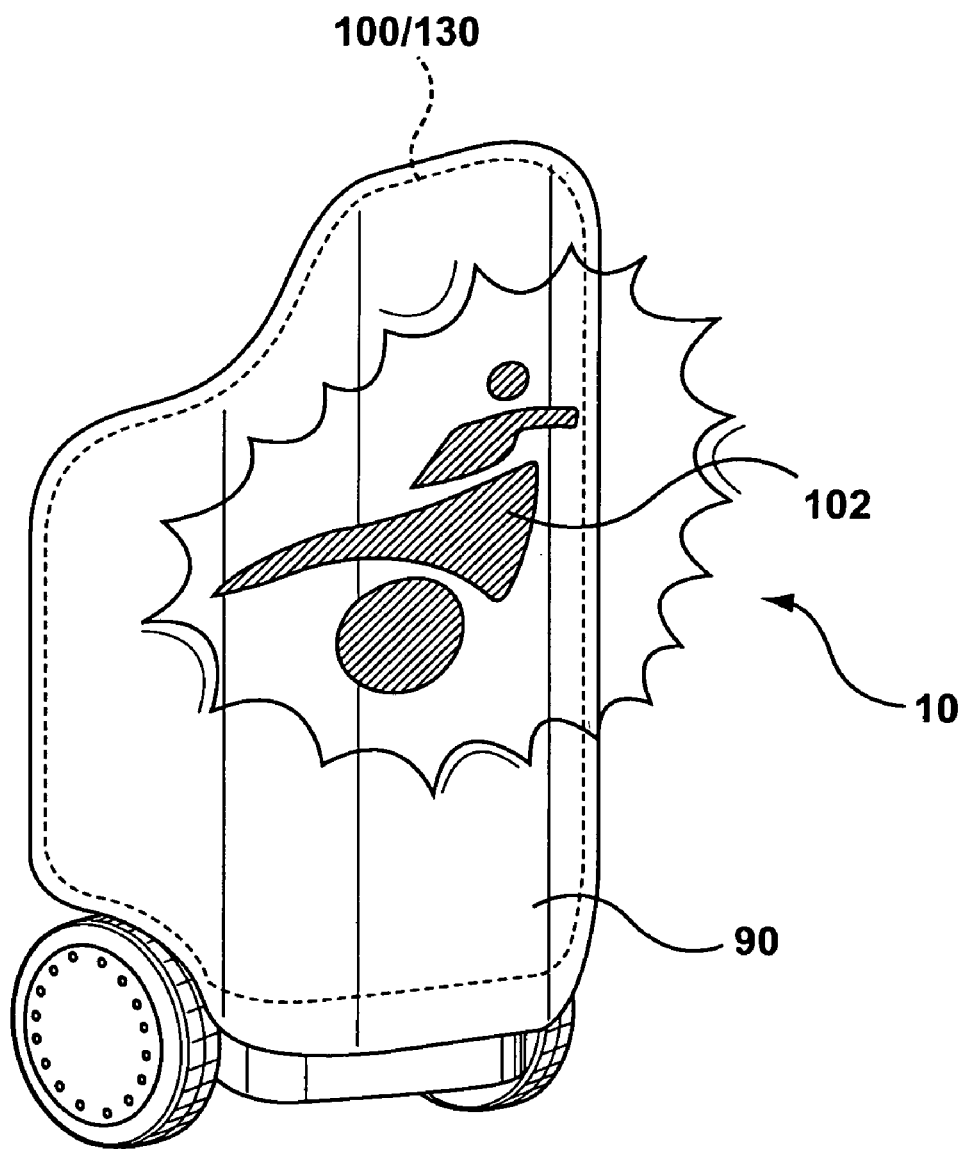
FIG. 7c is a front perspective view of a device according to the present invention when equipped with an image panel and an illumination means.

In a preferred embodiment, display surface 90 includes an image panel 100 having at least one image 102 displayed thereon, as shown in FIG. 7c. It will be appreciated that while image panel 100 may be affixed to the exterior of device 10 (i.e. front outside surface 86 and side outside surfaces 88), this is not required. Where at least one of front panel 14 and side panels 12 are composed of a transparent material, image panel 100 may be affixed to the interior of device 10. This protects image panel 100 from damage caused by objects striking the front outside surfaces 86, 88 of the device 10, while still permitting the image 102 to be visible on display surface 90. It will also be appreciated that image panel 100 may be rigid, conforming to the shape of device 10, or may be flexible so that it may be adhered (directly or indirectly) to the interior or exterior of device 10 (e.g. image panel 100 may be a thin, flexible sheet, for example a vinyl sheet).

It is desirable to provide illumination means for image panel 100, preferably in the form of backlighting. In one embodiment, shown in FIG. 6a, the illumination means comprises a plurality of vertically oriented fluorescent lights 110 positioned behind image panel 100. In this embodiment, image panel 100 and image 102 are translucent, so that fluorescent lights 110 illuminate image panel 100 and thereby image 102. Fluorescent lights 110 are secured within a frame 120 as shown in FIGS. 6b and 6c. The shape of frame 120 corresponds to the shape of device 10, and frame 120 is adapted to be secured on the interior of device 10 behind image panel 100. Alternatively, where device 10 is transparent, frame 120 may be secured directly on the interior of device 10, with image panel 100 secured on the exterior of device 10. Light will be transmitted from fluorescent lights 110 through transparent device 10 to illuminate image panel 100. Securing image panel 100 to exterior of device 10 may assist in reducing glare on the exterior surface of device 10, which could make it more difficult to properly observe image panel 100.

Still referring to FIGS. 6b and 6c, frame 120 has a plurality of receptacles 122 for receiving fluorescent lights 110. Receptacles 110 are conventional receptacles for fluorescent lights, and are connected to an electrical circuit (not shown) in known manner. Frame 120 also has a reflective back panel 124 for reflecting light from fluorescent lights 110 so as to create a more even distribution of light. Frame 120 may also have a translucent front panel (not shown) for diffusing light from fluorescent lights 110, again to provide a more even distribution of light to illuminate image 102. Reflective back panel 124 should be easily removable to permit replacement of fluorescent lights 110 after the end of their useful life.

LaserVisions Technology Inc., located at 675 Evans Court, Kelowna, British Columbia, Canada V1X 6G4, provides a number of products suitable for use in the present invention. These products comprise generally flat, flexible sheets that include illumination means for illuminating an image or images, as described in issued U.S. Pat. No. 6,242,076 and Published U.S. Patent Application Number 2002/014288 A1, both of which are hereby incorporated by reference in their entirety. Similar products are offered under the trademark CeeLite™ through CeeMee, Inc., located at 30 West Vine Street, Lansdale, Pa., U.S.A. 19446, in conjunction with RiLite Corporation of Taiwan. Such products, and any other product that provides a thin, flexible sheet including illumination means for illuminating an image, are included within the term "backlighting sheets", a term which also includes sheets having illumination means and which may be fixed in a shape corresponding to that of device 10. It will be appreciated that the products offered by LaserVisions Technology Inc., CeeMee Inc., and described in the above patent documents are referred to by way of example only, and that the present invention contemplates the use of any appropriate backlighting sheet, as described below.

A thin transparent or translucent sheet (i.e. an image panel 100) incorporating an image 102 may be removably secured to a backlighting sheet so that the image can be changed periodically, or may be assembled so as to be integral with the backlighting sheet (e.g. by placing an image panel 100 on top of the backlighting sheet and laminating the assembly so as to form an integral unit). Thus, as shown in FIG. 7a, an image panel 100 having an associated backlighting sheet 130 may be adhered to the interior surface of a (transparent) device 10 so as to present an image 102 visible on display surface 90, so that image 102 is illuminated when power is supplied to backlighting sheet 130, as shown in FIG. 7c. As noted above, in the configuration shown in FIG. 7a, backlighting sheet 130 may be integral with image panel 100, or alternately may be removably secured to image panel 100 to permit image panel 100 (and thereby image 102) to be changed without requiring a new backlighting sheet 130. In an alternate preferred embodiment, shown in FIG. 7b, device 10 is again transparent and backlighting sheet 130 may be secured directly on the interior of device 10, with image panel 100 secured on the exterior of device 10. When power is supplied to backlighting sheet 130, light will be transmitted through (transparent) device 10 to illuminate image panel 100. In a further alternative embodiment (not shown), both backlighting sheet 130 and image panel 100 (whether integral with each other or not) may be secured on the exterior of device 10. This configuration is less desirable, however, as it exposes backlighting sheet 130 to potential damage caused by objects impacting device 10.

In some instances, it will be desirable to provide an image panel 100 wherein certain portions of the image (or, alternatively, certain images selected from a plurality of images on the image panel) may be selectively illuminated. For example, such a capability could be used to create an animation effect, or simply to make an image more dynamic. Therefore, there is provided an embodiment of a device 10 having an image panel 100 having at least one image 102 and illumination means, wherein the illumination means and the at least one image each have a plurality of distinct regions. Each distinct region of the illumination means is co-located with a corresponding distinct region of the image 102, and control means are provided to selectively illuminate distinct regions of the illumination means, thereby illuminating distinct regions of the image.

Figure 8A:
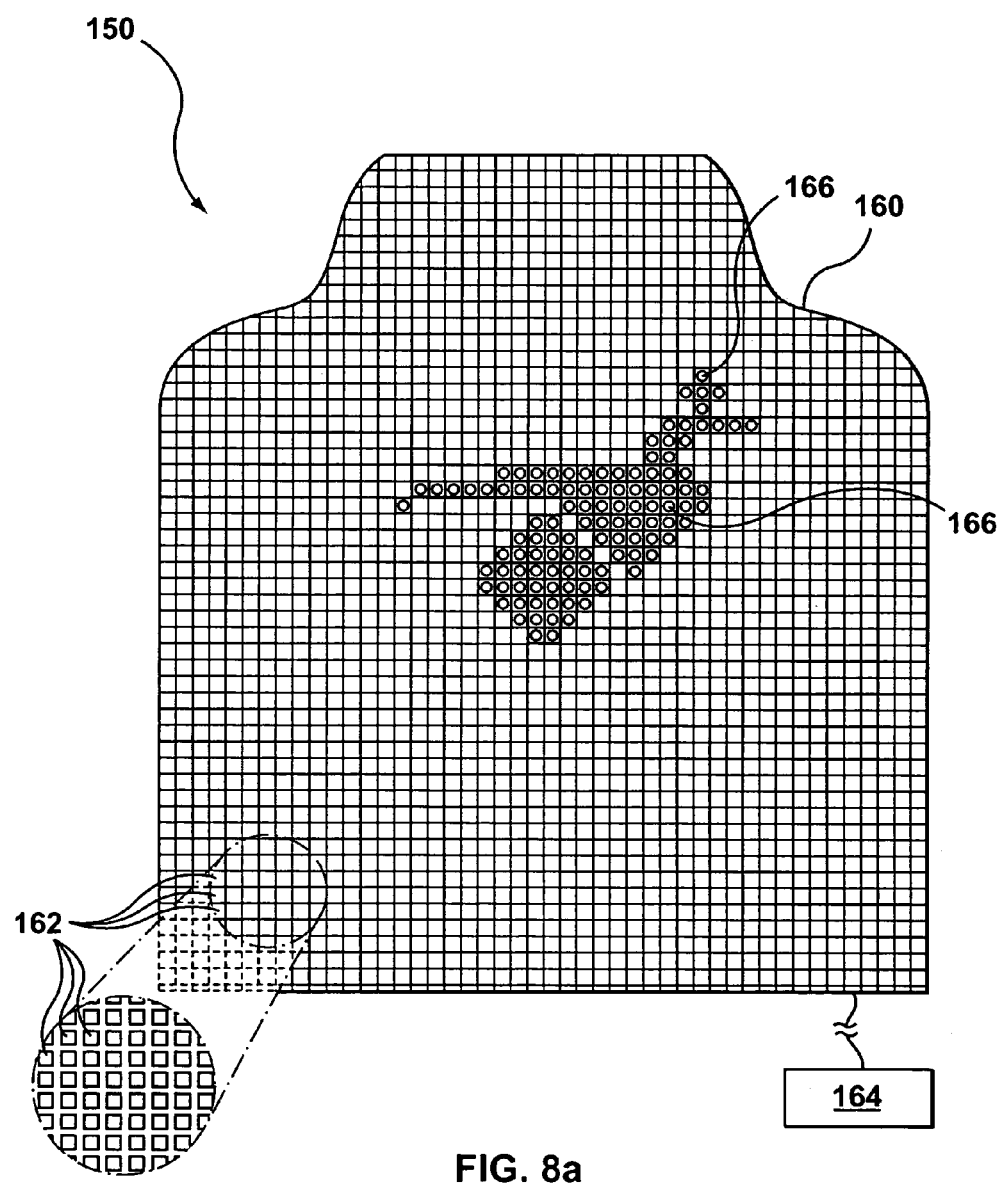
FIG. 8a is a front view of a third embodiment of an illumination means for use with a device according to the present invention.

Referring now to FIG. 8a, an embodiment of an illumination means for selectively illuminating portions of an image is shown generally at 150. The illumination means 150 comprises a backlighting sheet 160. Backlighting sheet 160 may be flexible, or may be rigid and have a shape corresponding to the shape of device 10. Backlighting sheet 160 has a plurality of individual backlighting elements 162, referred to herein as pixels 162, defining a uniform pattern on the backlighting sheet 160. As can be seen in the enlarged view in FIG. 8a, pixels 162 are separate from one another. While the pixels 162 shown in FIG. 8a are square, this is for ease of illustration only, and it will be appreciated that pixels 162 may have any uniform shape. For example, as shown in FIGS. 8c and 8d, pixels 162 have a hexagon and circular shape, respectively. The hexagon shape shown in FIG. 8c is particularly advantageous for creating circular patterns. Furthermore, the pattern of pixels 162 may be an offset pattern, as shown in FIG. 8e for square pixels and in FIG. 8f for circular pixels. The hexagonal pattern in FIG. 8c is also an offset pattern.

A controller 164 is operably connected to backlighting sheet 160. Pixels 162 are preferably individually addressable, so that each individual pixel can be selectively illuminated in response to a signal from the controller 164. Data may then be input into controller 164 so as to define regions 166 consisting of groups of (typically but not necessarily adjacent) pixels 162. Controller 164 may then illuminate any particular region 166 by illuminating the pixels 162 comprising that region 166. Regions 166 are selected to correspond to particular regions 168 of image 102 on image panel 100.

Figure 8B:
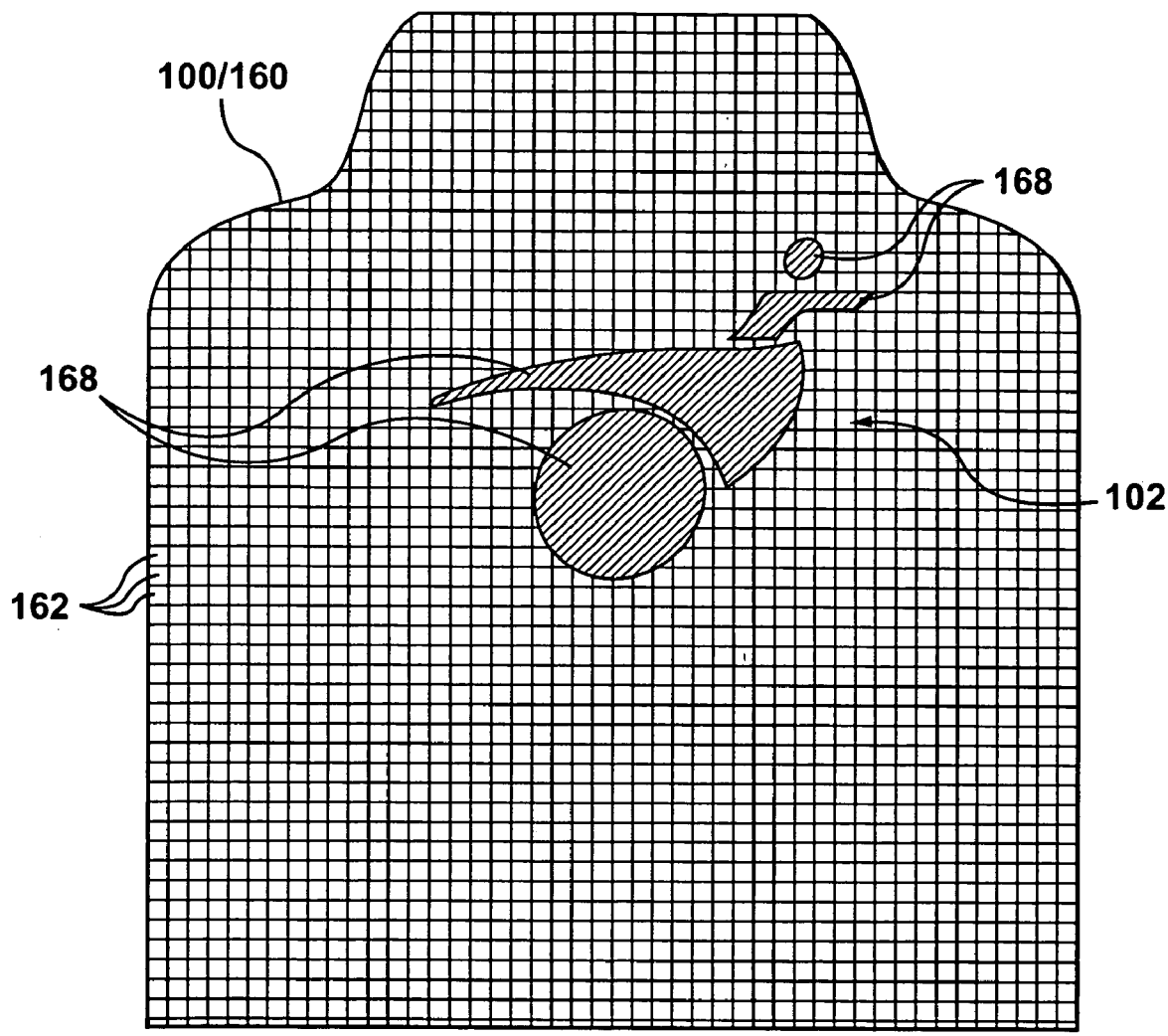
FIG. 8b is a front view of an image panel overlaid on top of a third embodiment of an illumination means for use with a device according to the present invention.
Figure 8C:
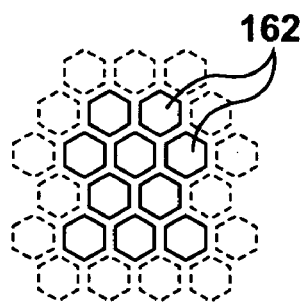
FIG. 8c is a second pixel pattern for a third embodiment of an illumination means for use with a device according to the present invention.
Figure 8D:
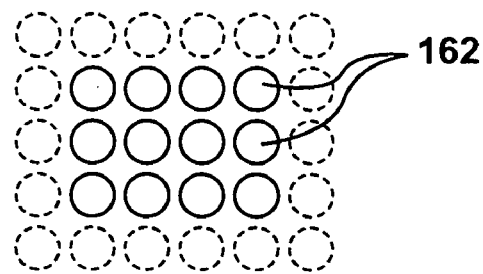
FIG. 8d is a third pixel pattern for a third embodiment of an illumination means for use with a device according to the present invention.
Figure 8E:
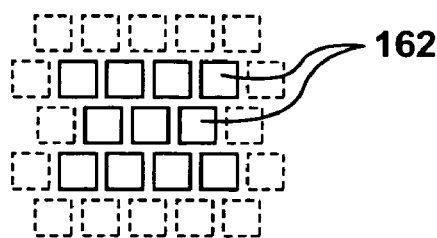
FIG. 8e is a fourth pixel pattern for a third embodiment of an illumination means for use with a device according to the present invention.
Figure 8F:
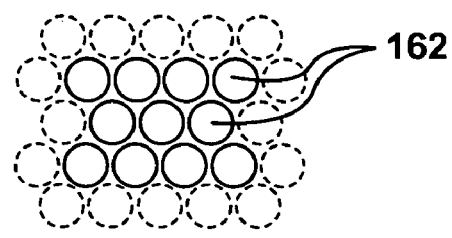
FIG. 8f is a fifth pixel pattern for a third embodiment of an illumination means for use with a device according to the present invention.

FIG. 8b shows an image panel 100 secured to a backlighting sheet 160, with pixels 162 shown with dashed lines. As can be seen by reference to FIGS. 8a and 8b, by superimposing on image panel 100 a pattern corresponding to the pattern of pixels 162 on backlighting sheet 160, it is possible to select regions 166 on backlighting sheet 160 corresponding to regions 168 of image 102. In other words, regions 168 and 166 will be co-located when image panel 100 is adhered to device 10 and backlighting sheet 160 is adhered to the back of image panel 100. Thus, when a region 166 of backlighting sheet 160 is illuminated by controller 164, a corresponding region 168 of image 102 is thereby illuminated. It will be appreciated that where backlighting sheet 160 is used, it is preferable to removably secure backlighting sheet 160 to image panel 100, rather than making them integral. This permits backlighting sheet 160 to be reused by changing the image panel 100 and entering new data into controller 164.

In a further preferred embodiment of backlighting sheet 160, if pixels 162 are made sufficiently small, and are capable of producing a range of colors (either individually or in groups where each pixel 162 produces a single primary color), then backlighting sheet 160 may be directed by controller 164 to produce any desired image, whether static or animated. In such a case, backlighting sheet 160 would itself comprise image panel 100 as well as backlighting sheet 160.

Figure 9:
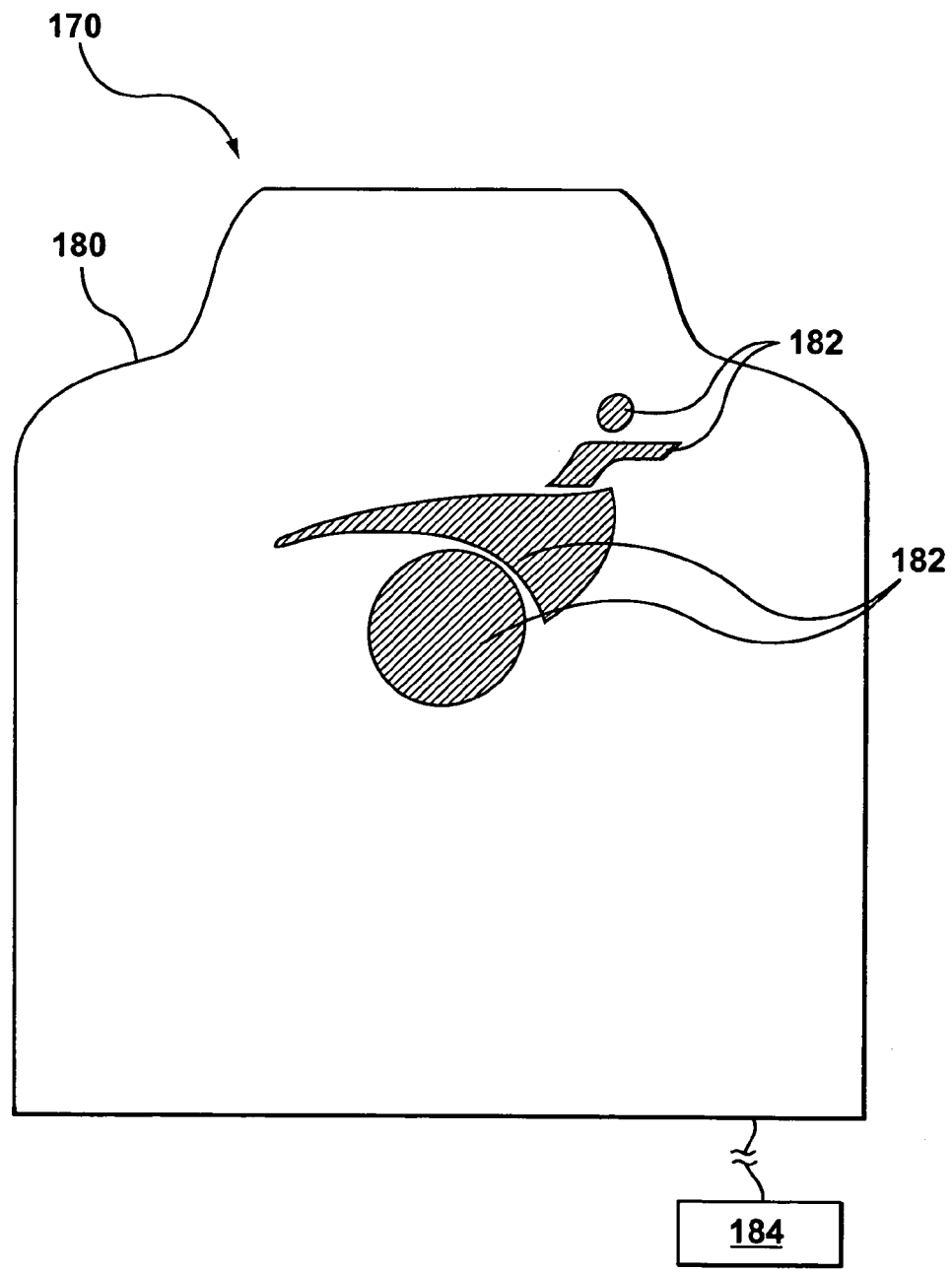
FIG. 9 is a fourth embodiment of an illumination means for use with a device according to the present invention.

Now referring to FIG. 9, an alternate embodiment of an illumination means having a plurality of distinct regions is shown generally at 170. Illumination means 170 comprises backlighting sheet 180, which in turn comprises a plurality of distinct, individually illuminable regions 182. Regions 182 are pre-selected prior to manufacture of the backlighting sheet 180 to correspond to regions of the image panel (not shown) with which backlighting sheet 180 will be used. Thus, backlighting sheet 180 will be constructed to have a plurality of distinct, invariable regions defined thereon, which correspond to and are co-located with distinct regions defined on an image panel (not shown) that will be overlaid on backlighting panel 180. Controller 184 is then operable to selectively illuminate the regions 182, thereby illuminating the corresponding region of the associated image panel (not shown). As can be seen, backlighting sheet 180 is intended for use with a single corresponding image panel, and is not meant for reuse. A product useful for this purpose is offered by CeeMee, Inc. in conjunction with RiLite Corporation of Taiwan under the name CLIPS (CeeLite™ Intelligent Promotional Signage), in which electrical circuits feeding separate illuminable regions of a backlighting sheet are isolated and then programmed to turn on and off, or fade, as desired.

As was described with respect to backlighting sheet 130, image panel 100 may be secured directly to the interior of device 10, with backlighting sheet 160 or 180 secured directly behind image sheet 100. Alternately, backlighting sheet 160 or 180 may be secured directly to the interior of device 10, with image panel 100 secured to the outside. This may be less preferable, however, as it may make it more difficult to ensure that distinct regions 168 of image 102 are co-located with corresponding regions 166, 182 of backlighting sheet 160, 180.

In a further preferred embodiment (not shown) of backlighting sheet 180, the distinct, invariable regions defined thereon may be given different colors (for example, by the use of different colors of electroluminescent ink) so that the regions 182 in fact define a colored image. This will obviate the need for a separate image panel 100, as backlighting sheet 180 would also be image panel 100, so that backlighting sheet 180 comprises an integral image panel.

In addition, LaserVisions Technology Inc. offers a product in which the backlighting sheet 180 cooperates with the image 102 on image panel 100 so as to cause a first image to be visible in daylight conditions and a second image to be visible in darkness.

It will be appreciated that the specific form of backlighting, and in particular the specific technology used for a backlighting sheet 130, 160 or 180, forms no part of the present invention. Furthermore, it will be appreciated that the division of backlighting sheet 160 into pixels 162, or of backlighting panel 180 into regions 182, may be accomplished by any means known in the art, and that the particular means used forms no part of the present invention. It will also be appreciated that image panel 100 and backlighting sheet 130, 160, 180 may cover all of display surface 90, or only part thereof. It will further be appreciated that multiple image panels 100 may be used with device 10. For example, one image panel 100 may be used to present an image on front outside surface 86, and two further image panels may be used to present an image on each side outside surface 88. Similarly, three distinct backlighting sheets 130, 160 or 180 may be used, one corresponding to front outside surface 86, and one corresponding to each side outside surface 88. Furthermore, a single backlighting sheet 130, 160, 180 may be divided into a plurality of independently controlled zones.

One skilled in the art will recognize that almost any illumination means will require a source of power. One possible option is to draw power from the on-board battery (not shown) of the personal transporter 1, using a transformer if necessary to modify the voltage. Alternatively, a separate battery or batteries may be mounted on the base of the personal transporter 1, secured to device 10, or worn by a rider (e.g. a number of batteries carried in pouches on a belt, or concealed within clothing such as boots).

It will also be appreciated that an additional battery may be used not only to provide a source of power for a backlighting sheet 130, 160 or 180, but optionally also to provide additional power to the personal transporter 1, so as permit it to operate for a longer continuous period of time. Such a battery may be a lead acid battery, but for safety reasons is preferably a gel battery.

The present invention also permits the provision of solar power to a personal transporter 1. In particular, device 10 may be constructed of a transparent material, and solar panels or solar tiles may be mounted to the interior of device 10 to absorb solar radiation and convert it into electrical energy. The electrical energy could then be used either to directly power personal transporter 1, or may be stored in a battery for later use. By making device 10 transparent and positioning the solar panels or solar tiles on the interior thereof, solar radiation is still able to reach the panels or tiles, but the panels or tiles are protected from damage (e.g. due to impact) by the material of device 10. Obviously, the solar panels or solar tiles could also be positioned on the exterior of device 10.

Figure 12:
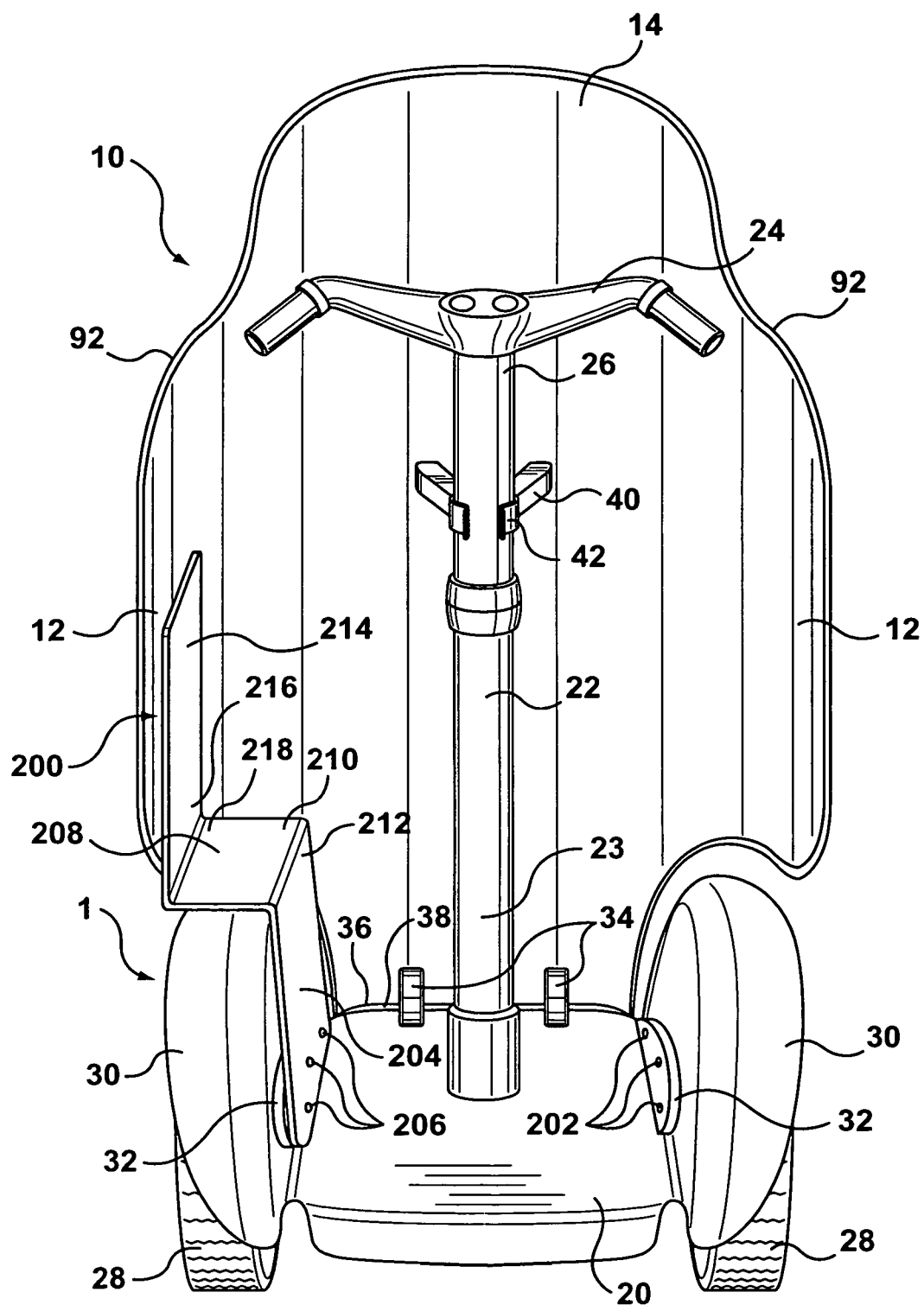
FIG. 12 is a rear view of a device according to the present invention, secured to a personal transporter, along with a carrier according to the present invention, also secured to said personal transporter.

Now referring to FIGS. 12, 13 and 14, a carrier 200 may be adapted for mounting to a personal transporter 1. Carrier 200 may be used to carry a battery, or to carry a container 201 for storage of other items. In the particular case of a Segway HT, each shroud 32 has three holes 202 tapped therein in a triangular pattern. Holes 202 are threaded for receiving screws or bolts. Carrier 200 comprises mounting plate 204 having three holes 206 defined therein. Holes 206 are arranged in a pattern corresponding to holes 202 on personal transporter 1 so that when mounting plate 204 is in a mounting position, each hole 206 on mounting plate 204 will be in registration with a corresponding hole 202 in shroud 32. This permits mounting plate 204 to be secured to shroud 32 by means of bolts or screws (not shown). Carrier 200 also comprises bottom support member 208, which is secured to (or molded integrally with) mounting plate 204, and is joined at its inner edge 210 to upper edge 212 of mounting plate 204 so as to extend generally perpendicularly therefrom. When Carrier 200 is mounted to a personal transporter 1, bottom support member 208 will be disposed above fender 30. Carrier 200 further comprises side support member 214, which has a lower edge 216 that is secured to (or molded integrally with) outside edge 218 of bottom support member 208.

Now referring in particular to FIGS. 13 and 14, container 201 is secured to (or is molded integrally with) side support member 214 and bottom support member 208. Preferably, container 201 is removably secured to side support member 214 and bottom support member 208, for example by means of Velcro strips 220, 221. This permits containers 201 to be rapidly interchanged while leaving carrier 200 mounted to personal transporter 1. Alternatively, a battery (not shown) may be secured to carrier 200 in the same manner as container 201. When carrier 200 is mounted to a personal transporter 1 as in FIG. 12, a container 201 or battery (not shown) secured thereto will be disposed generally above fender 30, a region which is generally not occupied by a rider's body. Together, bottom support member 208 and side support member 214 serve as support means for supporting a container 201 (or a battery) on mounting plate 204.

Figure 15:
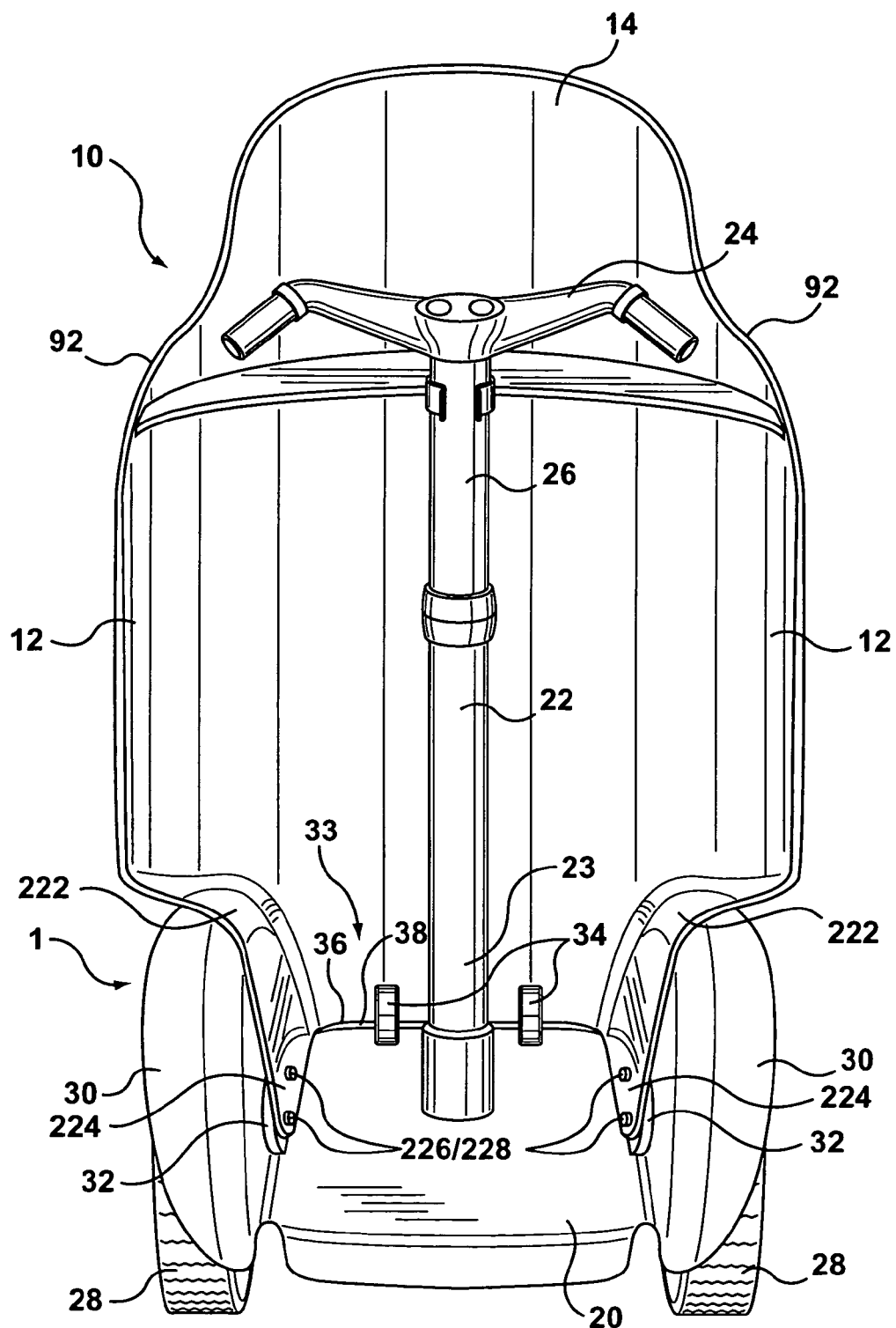
FIG. 15 is a rear view of an alternate embodiment of a device according to the present invention.
Figure 16:
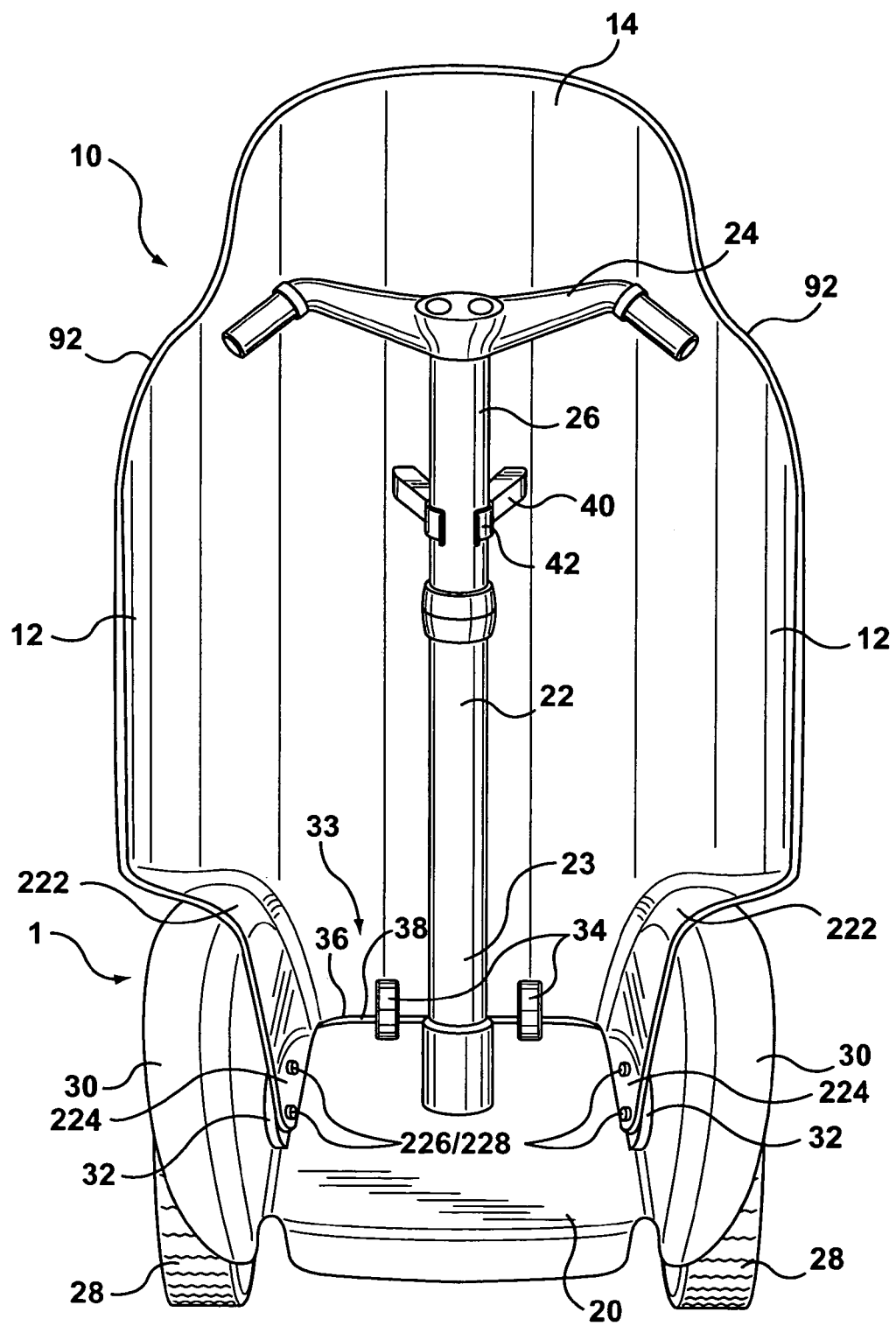
FIG. 16 is a rear view of an alternate embodiment of a device according to the present invention.

Carrier 200 may be used not only with a personal transporter 1 equipped with a device 10, but also on a personal transporter 1 that has not been equipped with a device 10. Where carrier 200 is used in conjunction with a device 10, and device 10 includes an image panel 100 (whether with or without backlighting), carrier 200 and any container 201 or battery (not shown) will be concealed behind device 10 relative to a viewer observing the front panel 14 or side panels 12 of device 10. It will of course be appreciated that other means for securing mounting plate 204 to a personal transporter 1 are encompassed within the scope of the present invention.

Where personal transporter 1 is a Segway HT, holes 202 in shrouds 32 provide a further advantageous method of mounting device 10 to personal transporter 1. Now referring to FIGS. 15 and 16, an alternate embodiment of device 10 is shown. In particular, side edges 12 of device 10 may include tapered portions 222 each terminating in mounting portion 224. Each mounting portion 224 has three holes 226 arranged in a pattern corresponding to holes 202 on personal transporter 1. Tapered portions 222 have a shape corresponding generally to the shape of fenders 30, so that when device 10 is in position for mounting to personal transporter 1, tapered portions 222 follow the contours of fenders 30 (although they need not be in contact therewith). Mounting portions 224 will then overlie shrouds 30 so that each hole 226 on a mounting plate 224 will be in registration with a corresponding hole 202 in a shroud 32. This permits sides 12 of device 10 to be mounted to personal transporter 1 by means of screws or bolts 228.

It will be appreciated by one skilled in the art that carrier 200 may be adapted so that mounting plate 204 is tapered according to the shape of fender 30 in a manner similar to that of tapered portions 222 and mounting portions 224 described above, without departing from the present invention.

There was described above a preferred embodiment of an attachment means for securing device 10 to a personal transporter 1, namely bracket 40 and clamp 42. However, where an image panel 100 is secured to the interior of device 10, the use of bracket 40 and clamp 42 to secure device 10 to personal transporter 1, as described with reference to FIG. 5, is undesirable for a number of reasons, particularly if illumination means such as a backlighting sheet is used. If screws, bolts, or rivets are used to secure bracket 40 to front panel 14, these will pierce image panel 100 and backlighting sheet 130, 160, 180, interfering with their operation. Alternately, if adhesive is used, bracket 40 will not be secured directly to front panel 14, but merely to the back of either image panel 100 or backlighting sheet 130, 160, 180. For this reason, second and third preferred embodiments of an attachment means for device 10 for engaging a second support on personal transporter 1 are described below.

Figure 10A:
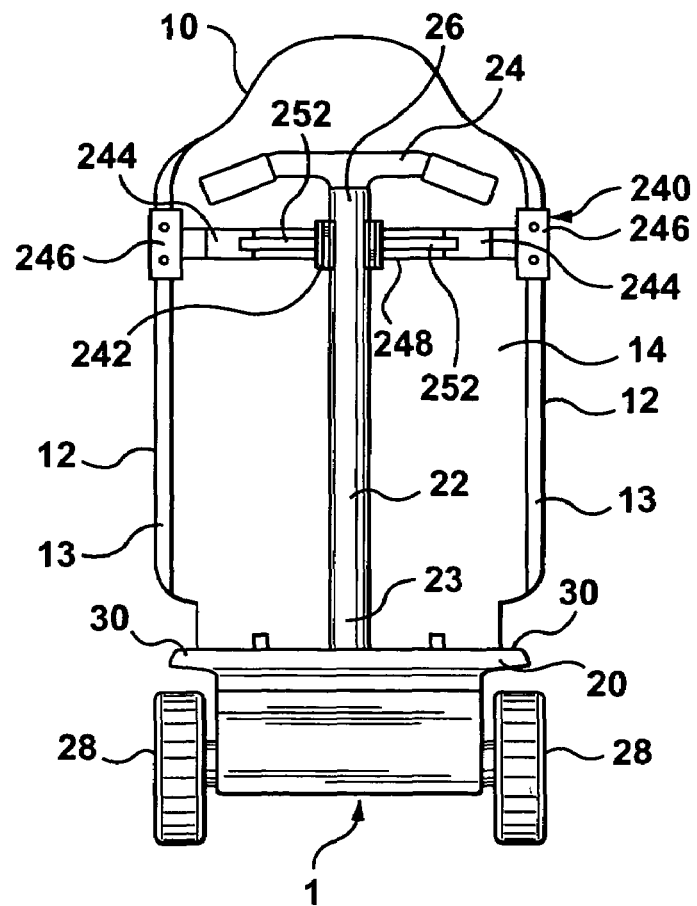
FIG. 10a is a rear view of a device according to the present invention, secured to a personal transporter.
Figure 10B:
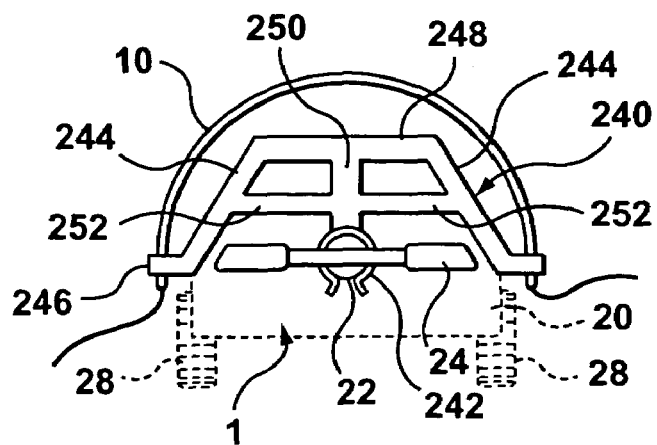
FIG. 10b is a top view of a device according to the present invention, secured to a personal transporter.

Referring to FIGS. 10a and 10b, a first alternate bracket for device 10 is shown generally at 240. Bracket 240 comprises side support members 244 having mounting ends 246, front support member 248, clamp support member 250 and secondary support members 252. Clamp support member 250 has clamp 242 secured thereto for engaging shaft 22 of personal transporter 1 in an interference fit. It will be appreciated that clamp 242 may be secured to clamp support member 250 by any means known in the art, including screws, bolts, welding, or a sufficiently strong adhesive. Clamp 242 is preferably identical to clamp 42 described above, and bracket 240 is preferably composed of a rigid material.

Bracket 240 is secured to device 10 by means of mounting ends 246 of side support members 244. As can be seen in FIG. 10a, side panels 12 terminate at flat rearward edges 13, providing a surface to which mounting ends 246 of side support members 244 may be secured. Mounting ends 246 may be secured to edges 13 by any means known in the art, such as screws, bolts, rivets, welding, or a sufficiently strong adhesive. Optionally, mounting ends 246 may be removably secured to edges 13, for example by permanently securing a first engagement means to each edge 13, and securing corresponding engagement means to mounting ends 246, so that bracket 240 may be selectively engaged and disengaged from device 10. Such an engagement means may (by way of example only) include mechanical or magnetic connections. Making bracket 240 removably securable to device 10 permits an image panel 100 (with or without backlighting sheet 130, 160, 180) to be more easily installed and replaced.

It will be appreciated by one skilled in the art that the embodiment of bracket 240 shown in FIGS. 10a and 10b is exemplary only, and many modifications may be made thereto without departing from the scope of the present invention. For example, secondary support members 252 may be omitted (not shown), or clamp support member 250 may be replaced by two separate clamp support members extending from the side support members 244 (not shown). Furthermore, it will be appreciated that bracket 240 may comprise a single integral element, or may be constructed of multiple elements secured together by any means in the art. Bracket 240 may be constructed of metal, plastic, or any other suitable material.

Figure 11A:
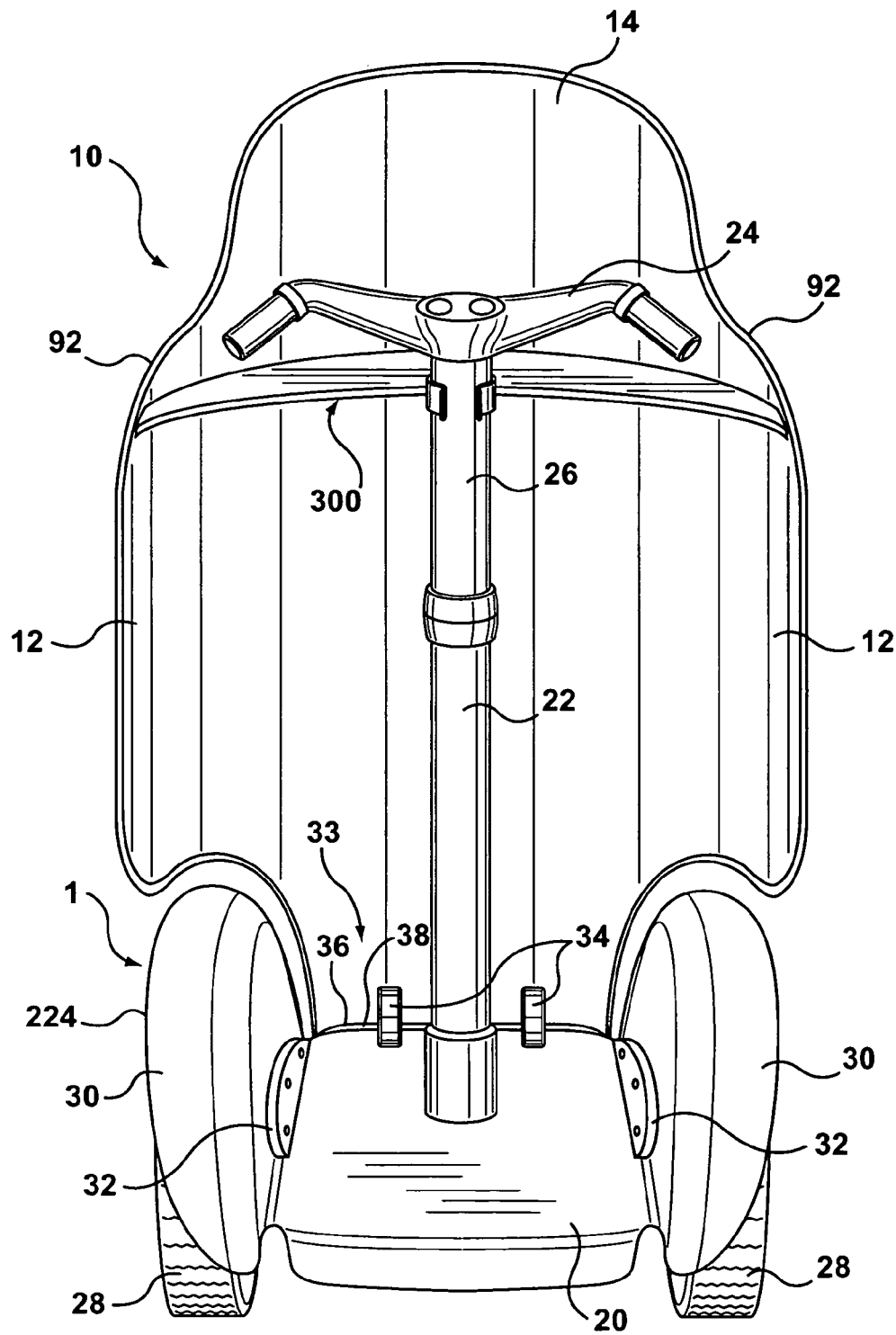
FIG. 11a is a rear view of a device according to the present invention, secured to a personal transporter.
Figure 11B:
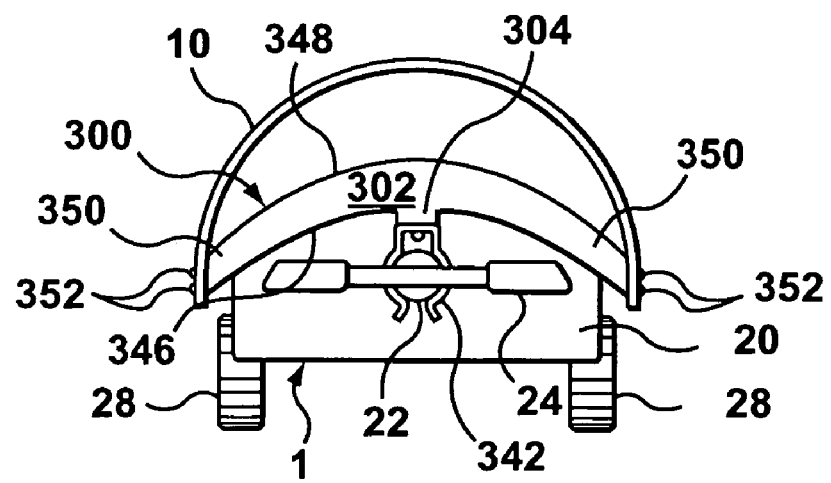
FIG. 11b is a top view of a device according to the present invention, secured to a personal transporter.
Figure 11C:
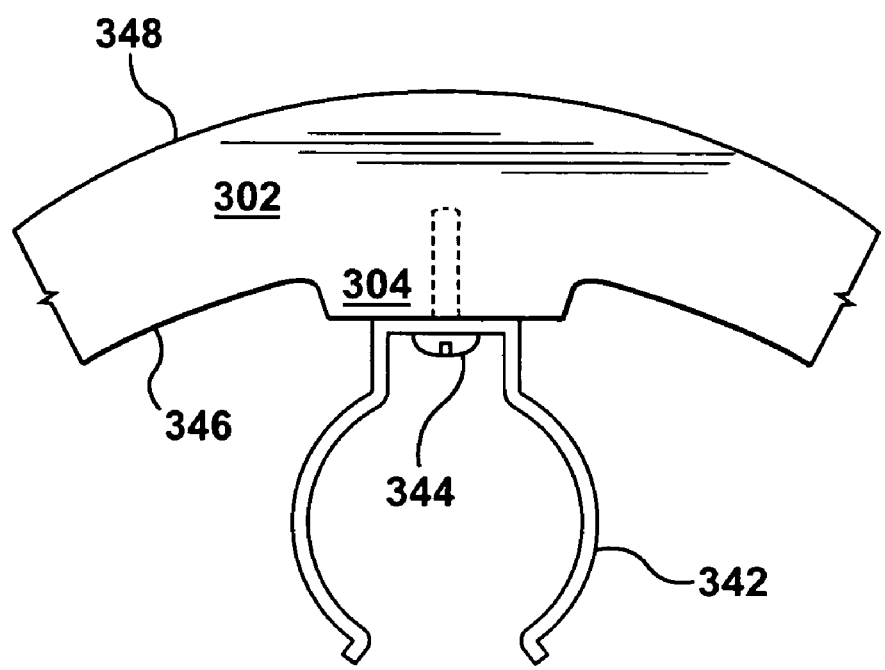
FIG. 11c is a top view of a portion of an embodiment of an attachment means for a device according to the present invention.

Now referring to FIGS. 11a, 11b and 11c, a third preferred embodiment of a bracket means for securing device 10 to a personal transporter 1 is shown generally at 300. Bracket 300 comprises generally crescent-shaped curved bracket member 302 and clamp support member 304. Clamp 342 is secured to clamp support member 304, and is preferably identical to clamp 42 described above. Bracket 300 is preferably composed of a rigid material. Clamp support member 304 may be integrally formed with curved bracket member 302, or may be a separate piece secured to curved bracket member 302, or may be a combination of the two (i.e. part of clamp support member 304 may be integrally formed with curved bracket member 302, and part may be a separate piece secured thereto). As with clamps 42 and 242, clamp 342 may be secured to clamp support member 304 by any means known in the art. In the embodiment shown in FIG. 11c, clamp 342 is secured by at least one bolt 344. Bracket 240 may be constructed of metal, plastic, or any other suitable material. One skilled in the art will appreciate that neither rear edge 346 nor front edge 348 need have a particular curvature, and further, that they need not have the same curvature.

Bracket 300 is secured to device 10 by means of mounting ends 350. As can be seen in FIGS. 11a and 11b, side panels 12 provide a surface to which mounting ends 350 of bracket 300 may be secured. Mounting ends 350 may be secured to side panels 12 by any means known in the art, such as screws, bolts, rivets, welding, or a sufficiently strong adhesive. In the particular embodiment shown in FIG. 11b, mounting ends 350 are secured to side panels 12 by bolts 352. As with bracket 240, mounting ends 350 may optionally be removably secured to side panels 12, for example by permanently securing a first engagement means to an upper edge of each side panel 12, and securing corresponding engagement means to mounting ends 350, so that bracket 300 may be selectively engaged and disengaged from device 10. Such an engagement means may (by way of example only) include mechanical or magnetic connections.

Making bracket 240, 300 removably securable to device 10 permits an image panel 100 (with or without backlighting sheet 130, 160, 180) affixed to the interior of device 10 to be more easily installed and replaced. In particular, an image panel 100 could be removed and placed into storage, and a different image panel installed in its place. At a later time, the original image panel could be reinstalled and reused. The adhesion means used to secure image panel 100 to device 10 would of course be selected to permit image panel 100 to be removed without damage. It will be appreciated that such replacement and reuse of image panels 100 will still be possible, although more difficult, if bracket 240, 300 is permanently secured to device 10.

It will also be seen by one skilled in the art that because bracket 240, 300 is secured to side edges 12 of device 10, it may assist in reducing undesirable lateral movement of side edges 12.

As can be seen most clearly in FIGS. 10b and 11b, bracket 240, 300 is particularly suitable where an image panel 100 (often with an associated backlighting sheet 130, 160, 180) is secured to the interior of the device 10, because bracket 240 does not contact the interior of device 10, and thereby avoids the problems associated with the use of bracket 40 in such circumstances. Alternately, there may be provided resilient cushioning means (not shown) positioned in an interference fit between bracket 240, 300 and the interior of device 10, to provide greater support for device 10 while distributing pressure evenly so as to avoid damage to any image panel 100 or backlighting sheet 130, 160, 190. Whether it is appropriate to use cushioning means will of course depend on the particular characteristics of the image panel and backlighting sheet 130, 160,180 (if any) used.

As seen in FIGS. 10a and 11a, bracket 240, 300 is preferably mounted just below handlebar 24. This configuration provides stability for the device 10 when mounted on personal transporter 1. It will be appreciated, however, that bracket 240, 300 may be mounted lower if desired, or may have an alternate configuration in which it is mounted to each side panel 12 at two or more locations.

One skilled in the art will appreciate that bracket 240, 300 may be adapted to provide features to assist in storage. For example, bracket 240, 300 may be adapted to include a cupholder, or to include hook elements on an underside thereof from which (for example) sample or shopping bags could hang.

The present invention also facilitates a method of communicating an advertising message to potential customers. In particular, the method comprises providing a personal transporter 1 intended to transport a rider in a standing position and providing an advertising display panel (e.g. image panel 1 on device 10) on the personal transporter 1. The advertising display panel would have at least one advertising message disposed thereon, and an employee would then operate the personal transporter having the advertising display panel at a location typically frequented by persons within a desired target audience. For example, a personal transporter 1 having a device 10 could have the trademark of a particular food or beverage emblazoned on the display surface 90, and be operated by an employee carrying samples or promotional material (or alternatively, the personal transporter could be equipped with the samples or material). The employee could then be sent to operate personal transporter 1 at a location attended by large numbers of people, allowing the employee to take advantage of public curiosity to distribute the samples or material. Furthermore, device 10 may be equipped with an integral sound system, so that an audio aspect could be added to the visual material. As noted above, it will be appreciated by one skilled in the art that device 10 may in fact have multiple distinct display surfaces. For example, there may be one distinct display surface on front outside surface 86 and two further distinct display surfaces on side outside surfaces 88.

Another advantage provided by the present invention is that of protection for the rider. The design of a conventional personal transporter exemplified by the Segway HT does not provide significant protection to its operator, leaving substantially all of a rider's body exposed. Since a Segway HT is capable of travelling at substantial speeds (relative to walking), there is a risk of injury to the rider should a pedestrian who does not see the vehicle turn suddenly or raise an arm.

Device 10, however, provides protection for a rider. Referring to FIG. 1, it can be seen that front panel 14 will cover at least a lower part of a rider's front, and side panels 12 will cover at least a lower part of a rider's sides. Referring now to FIG. 2, since side panels 12 extend approximately to the height of handlebar 24, protection for a rider's sides is provided up to generally waist or hip level. Similarly, front panel 14 rises several inches above handlebar 24 so that protection for a rider's front is provided up to generally the waist or midsection. Furthermore, personal transporters elevate a rider above ground level (by 8 inches, in the case of a Segway HT), so that the protection provided by side panels 12 and front panels 18 extends even higher when measured relative to a pedestrian at ground level.

Furthermore, the preferred embodiment of device 10 also provides limited protection for a rider's back, because the rear edges 13 of side panels 12 can intercept a swinging limb following an arcuate path. Although a rider's back will still have some exposure, this is necessary to permit the rider to mount and dismount personal transporter 1. Furthermore, protection of a rider's back is of lesser importance than protection of a rider's front and sides, since it is collisions with the front and sides which are more likely to occur during normal forward travel of personal transporter 1.

Device 10 has potential uses in a law enforcement context. In particular, police officers may be equipped with personal transporters as an alternative to traditional foot patrol. In such applications, device 10 is preferably composed of a bullet-resistant material, and more preferably composed of a bullet resistant material that is also transparent. Referring to FIG. 1, it can be seen that side panel 12 does not extend as high as front panel 14. This results from curved recess 92 at the location where the portion of device 10 comprising side panel 12 curves to become the portion of device 10 comprising front panel 14. Recess 92 allows a police officer to extend his or her arm to fire a handgun, while crouching so that the rest of his or her body, including the head, remains behind the protection of (bullet-resistant) device 10. Since device 10 when used in law enforcement applications is also preferably transparent, a police officer firing from a protected position behind device 10 would still be able to see the target at which he or she is aiming. Optionally, device 10 may be equipped with a gun port, analogous to those used on armored trucks. Alternatively, device 10 may be nontransparent, and may be equipped with a plate of transparent, bullet-resistant material located in an upper portion of front panel 14 to provide visibility. In a still more preferred embodiment (not shown), device 10 comprises at least one handle located on the interior surface of front panel 14, so that a police officer may carry (bullet-resistant) device 10 with him or her if it becomes necessary to dismount from personal transporter 10 and enter a potentially hostile situation.

In a law enforcement context, the use of a backlighting sheet 130, 160 or 180 may be particularly advantageous. A simple backlighting sheet 130 may be used to increase a police officer's visibility during night patrols. Alternatively, a backlighting sheet 160 or 180 having distinct regions defined thereon may be used to create an impression of alternating flashing lights (e.g. red and blue) similar to those deployed on police automobiles and which may symbolize to the public the presence of emergency services personnel.

Personal transporters equipped with a device 10 may also have application to military use (e.g. through a specially designed military version of personal transporter 1). As in the law enforcement context, device 10 may be constructed from a bullet-resistant material, and optionally provided with a gun port and/or a handle permitting a soldier to dismount from the personal transporter 1 and carry device 10 with him or her. In military applications, backlighting panels 160, 180 may be useful for providing a camouflage pattern on display surface 90 of device 10, to assist in concealing the soldier (i.e. the intensity of light provided by backlighting sheet 130, 160, 180 may be varied depending on lighting conditions). The camouflage pattern may be a fixed pattern (using backlighting sheet 130,180). More preferably, however, device 10 is equipped with at least one generally rearward-looking light sensor (not shown), and backlighting sheet 160 has pixels 162 which can present a range of colors. An image is transmitted from the camera to controller 164, which operates to present that image on backlighting sheet 160. Thus, rather than presenting a standard camouflage pattern, device 10 may present a precise image of the background behind it, potentially making device 10 more difficult to detect visually. Such a system is described in U.S. Pat. No. 6,459,076 to Schlenker.]

It will be appreciated by one skilled in the art that numerous variations and modifications may be made to the embodiments described above without departing from the scope of the present invention, and all such variations and modifications are intended to be encompassed within the scope of the present invention as defined by the appended claims.

The invention claimed is:

1. A panel device for use with a personal transport vehicle configured to transport a rider in a standing position, the panel device comprising:
   a) a front panel having a front outer surface for facing forwardly of the vehicle;
   b) a pair of side panels, each side panel extending rearwardly from a respective lateral side of the front panel; and
   c) at least one attachment element joined to the panel device for releasably securing the panel device to the vehicle,
   wherein the at least one attachment element comprises at least one hook member secured to the panel device and adapted to engage a support member of the vehicle, and a clamp joined to an inner surface of at least one of the front and side panels and adapted to releasably engage a steering column member of the vehicle,
   wherein the panel device further comprises at least one bracket, the bracket secured to said inner surface of the panel device and the clamp secured to the bracket, and wherein the bracket comprises at least one mounting arm secured to said inner surface at least at two laterally spaced apart mounting locations.

2. The panel device of claim 1 wherein the bracket further comprises a projecting arm joined to the bracket intermediate the spaced apart mounting locations, the clamp secured to the projecting arm.

3. A panel device for use with a personal transport vehicle configured to transport a rider in a standing position, the panel device comprising:
   a) a front panel having a front outer surface for facing forwardly of the vehicle;
   b) a pair of side panels, each side panel extending rearwardly from a respective lateral side of the front panel; and
   c) at least one attachment element joined to the panel device for releasably securing the panel device to the vehicle,
   and wherein each side panel has a lower edge comprising a generally concave lower cut-out to accommodate a respective wheel of the vehicle.

4. The panel device of claim 3, wherein each side panel has an upper edge comprising a generally concave upper cut-out opposite the lower cut-out.

5. The panel device of claim 3, wherein at least a portion of the front outer surface comprises a display panel.

6. The panel device of claim 5, wherein the display panel comprises at least one image displayed thereon.

7. A panel device for use with a personal transport vehicle configured to transport a rider in a standing position, the panel device comprising:
   a) a front panel having a front outer surface for facing forwardly of the vehicle;
   b) a pair of side panels, each side panel extending rearwardly from a respective lateral side of the front panel; and
   c) at least one attachment element joined to the panel device for releasably securing the panel device to the vehicle,
   and wherein at least a portion of the front outer surface comprises a display panel, and
   wherein the display panel further comprises an illuminating element for illuminating at least a portion of the display panel.

8. In combination, a personal transport vehicle and a panel device,
   the personal transport vehicle comprising:
      (i) a base having an upper standing surface for supporting a rider in a standing position;
      (ii) a single pair of laterally opposed wheels coupled to the base for rollably supporting the vehicle; and
      (iii) a steering column extending upright from the base;
   the panel device comprising:
      (iv) a front panel having a front outer surface for facing forwardly of the vehicle;
      (v) a pair of side panels, each side panel extending rearwardly from a respective lateral side of the front panel; and
      (vi) at least one attachment element joined to the panel device for releasably securing the panel device to the vehicle.

9. The combination of claim 8, wherein the at least one attachment element comprises at least one hook member secured to the panel device adjacent a lower end thereof and releasably engageable with the base of the vehicle.

10. The combination of claim 8, wherein the at least one attachment element comprises a clamp joined to an inner surface of at least one of the front and side panels and releasably engageable with the steering column.

11. The combination of claim 8, wherein the vehicle further comprises a handlebar mounted to the steering column, the front panel of the panel device having an upper edge disposed at an elevation generally equal to or greater than the elevation of the handlebar.

12. The combination of claim 8, wherein each side panel has a lower edge comprising a generally concave lower cut-out to accommodate a respective one of the wheels of the vehicle.

13. The combination of claim 12, wherein each side panel has an upper edge comprising a generally concave upper cut-out opposite the lower cut-out.

14. The combination of claim 8, wherein at least a portion of the front outer surface comprises a display panel.

15. The combination of claim 14, wherein the display panel comprises at least one image displayed thereon.

16. The combination of claim 15, further comprising illumination means for illuminating at least a portion of the display panel.

17. The combination of claim 16, wherein the illumination means comprises a plurality of vertically oriented tubular light bulb members.

18. The combination of claim 8, wherein each side panel has a generally concave lower edge disposed in a generally vertical plane.

19. The combination of claim 18, wherein the generally concave lower edge of each side panel is generally parallel with a portion of the circumference of a respective one of the wheels.

20. The combination of claim 18, wherein each generally concave lower edge is approximately quarter round in extent.

21. The combination of claim 8, wherein each side panel has an upper edge that decreases in elevation in a front-to-rear direction along the upper edge.

22. The combination of claim 21 wherein the upper edge of each side panel is generally concave along at least a portion thereof, said generally concave portion of the upper edge disposed in a generally vertical plane.

23. The combination of claim 22 wherein said generally concave portion of the upper edge is approximately quarter round in extent.

* * * * *